(12) United States Patent
Kang

(10) Patent No.: US 12,125,055 B2
(45) Date of Patent: Oct. 22, 2024

(54) DEVICE AND METHOD FOR ASSIGNING PRODUCT COLLATERAL VALUE IN METAVERSE WAREHOUSE

(71) Applicant: aiZEN Global Co., Inc., Seoul (KR)

(72) Inventor: Jung Seok Kang, Seoul (KR)

(73) Assignee: AIZEN GLOBAL CO., INC., Seoul (KR)

(*) Notice: Subject to any disclaimer, the term of this patent is extended or adjusted under 35 U.S.C. 154(b) by 0 days.

(21) Appl. No.: 18/051,111

(22) Filed: Oct. 31, 2022

(65) Prior Publication Data
US 2023/0401594 A1   Dec. 14, 2023

(30) Foreign Application Priority Data
Jun. 8, 2022   (KR) .................. 10-2022-0069391

(51) Int. Cl.
*G06Q 30/0201*   (2023.01)
*G06Q 10/087*   (2023.01)

(52) U.S. Cl.
CPC ....... *G06Q 30/0206* (2013.01); *G06Q 10/087* (2013.01)

(58) Field of Classification Search
CPC ............ G06Q 10/087; G06Q 10/0833; G06Q 10/0838; G06Q 30/0206; H04L 9/32
USPC .......................................................... 705/50
See application file for complete search history.

(56) References Cited

U.S. PATENT DOCUMENTS

2011/0040659 A1*  2/2011  Funaki ................ G06Q 10/087
                                                                    705/28

OTHER PUBLICATIONS

"Perpetual Contract NFT as Collateral for DeFi Composability" Published by IEEE (Year: 2022).*

* cited by examiner

*Primary Examiner* — Zeina Elchanti
(74) *Attorney, Agent, or Firm* — Mark T. Vogelbacker; Eckert Seamans Cherin & Mellott, LLC

(57) ABSTRACT

A method and device for assigning a product collateral value in a metaverse warehouse can include receiving, by a product collateral valuation device, product distribution data and determining, by the product collateral valuation device, product collateral value data on the basis of the product distribution data. The product distribution data can include product warehousing data, product unstoring data, and product storage data generated from the metaverse warehouse.

16 Claims, 19 Drawing Sheets

DEVICE AND METHOD FOR ASSIGNING PRODUCT COLLATERAL VALUE IN METAVERSE WAREHOUSE

CROSS-REFERENCE TO RELATED APPLICATION

This application claims priority to and the benefit of Korean Patent Application No. 10-2022-0069391, filed on Jun. 8, 2022, the disclosure of which is incorporated herein by reference in its entirety.

BACKGROUND

1. Field of the Invention

The present invention relates to a method of assigning a product collateral value in a metaverse warehouse and a device for performing the method. More particularly, the present invention relates to a method of assigning a product collateral value on the basis of distribution data in a metaverse and a device for performing the method.

2. Discussion of Related Art

There is a growing trend for major companies to provide metaverse platforms and content, and as investment and technology development increase, the market related to newly released financial products related to metaverses is growing.

Naver launched its metaverse platform Zepeto in 2018, and the number of users has now exceeded 200 million. Roblox of the US has become very popular as a gaming platform, and the number of daily active users (DAUs) was 46.6 million as of June 2021 which was an increase of 28% compared to July 2020.

For technological innovation in the metaverse field, global big tech companies, such as Facebook, Apple, Microsoft, etc., are presenting investments and visions and are actively pursuing team reorganization, tech company undertaking, etc. Further, domestic and foreign financial companies are launching various financial products, such as metaverse-related funds, exchange traded funds (ETFs), exchange traded notes (ETNs), etc., increasing people's interest in investment.

In the financial industry, information transmission and customer convenience are expected to be improved through a metaverse, and an increasing number of financial companies are providing services related to a metaverse such as virtual reality (VR), augmented reality (AR), etc.

As the scope of use of metaverses expands with the development of technology, the basis of various communication activities including finance may move from the mobile environment to a metaverse (a virtual world). When a metaverse environment is established, the visual constraint of a smartphone display can be overcome, and the communication method can also be expanded from touch to voice or movement.

Financial companies can transmit accurate and detailed information, and customers can conveniently use a service without visiting a store. Such a metaverse technology can be used not only in the financial industry but also in the distribution industry such as logistics. The metaverse technology makes it possible to make a more accurate and intuitive determination on the distribution and states of products, and new services can also be created by applying a metaverse to various fields.

As the related art, there is Korean Unexamined Patent Application No. 10-2021-0116417.

SUMMARY OF THE INVENTION

The present invention is directed to resolving all the problems described above.

The present invention is also directed to assigning a product collateral value in a metaverse warehouse.

The present invention is also directed to determining product collateral value data on the basis of product distribution data and providing a financial service to a seller on the basis of the product distribution data in addition to sales credit.

According to an aspect of the present invention, there is provided a method of assigning a product collateral value in a metaverse warehouse, the method comprises receiving, by a product collateral valuation device, product distribution data and determining, by the product collateral valuation device, product collateral value data on the basis of the product distribution data, wherein the product distribution data includes product warehousing data, product unstoring data, and product storage data generated from the metaverse warehouse.

Meanwhile, wherein the determining of the product collateral value data on the basis of the product distribution data comprises determining, by the product collateral valuation device, product sales cycle data and product sales rate data on the basis of the product warehousing data and the product unstoring data, determining, by the product collateral valuation device, product in-stock rate data and product value data on the basis of the product storage data and determining, by the product collateral valuation device, the product collateral value data on the basis of the product sales cycle data, the product sales rate data, the product in-stock rate data, and the product value data.

Further, wherein the determining of the product collateral value data comprises converting, by the product collateral valuation device, the product sales cycle data into estimated product sales cycle data, converting, by the product collateral valuation device, the estimated product sales cycle data into estimated product sales revenue data and determining, by the product collateral valuation device, the product collateral value data on the basis of the estimated product sales revenue data.

According to another aspect of the present invention, there is provided a device for assigning a product collateral value in a metaverse warehouse, wherein the device is implemented to receive product distribution data and determine product collateral value data on the basis of the product distribution data, wherein the product distribution data includes product warehousing data, product unstoring data, and product storage data generated from the metaverse warehouse.

Meanwhile, wherein the determining of the product collateral value data on the basis of the product distribution data comprises determining, by the product collateral valuation device, product sales cycle data and product sales rate data on the basis of the product warehousing data and the product unstoring data, determining, by the product collateral valuation device, product in-stock rate data and product value data on the basis of the product storage data and determining, by the product collateral valuation device, the product collateral value data on the basis of the product sales cycle data, the product sales rate data, the product in-stock rate data, and the product value data.

Further, wherein the determining of the product collateral value data comprises converting, by the product collateral valuation device, the product sales cycle data into estimated product sales cycle data, converting, by the product collateral valuation device, the estimated product sales cycle data into estimated product sales revenue data and determining, by the product collateral valuation device, the product collateral value data on the basis of the estimated product sales revenue data.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
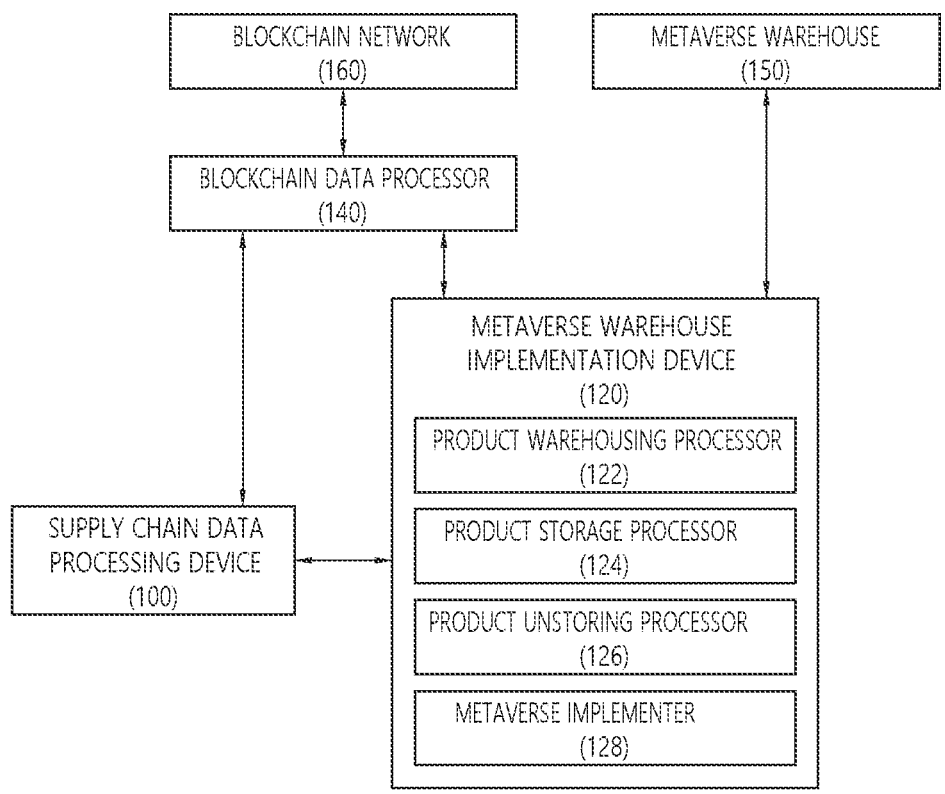
FIG. 1 is a conceptual diagram of a metaverse warehouse implementation system for implementing a metaverse warehouse according to an exemplary embodiment of the present invention.

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

FIG. 1 is a conceptual diagram of a metaverse warehouse implementation system for implementing a metaverse warehouse according to an exemplary embodiment of the present invention.

FIG. 1 shows a metaverse warehouse implementation system for warehousing, storing, and unstoring products.

Referring to FIG. 1, the metaverse warehouse implementation system may include a supply chain data processing device 100, a metaverse warehouse implementation device 120, a blockchain data processor 140, and a blockchain network 160.

The supply chain data processing device 100 may be intended to collect and process supply chain data generated in a supply chain to actually distribute products.

The supply chain data may be data generated from product distribution such as product production, sales, storage, distribution, purchase, etc.

The supply chain data processing device 100 may include a plurality of servers for processing the supply chain data. The plurality of servers may be stratified, and data of the servers collected in accordance with hierarchies may be selectively used for implementing a metaverse warehouse. Among the supply chain data generated by the supply chain data processing device 100, data related to a metaverse warehouse may be classified and transmitted to the metaverse warehouse implementation device 120.

The supply chain data processing device 100 may provide a supply chain service in the metaverse on the basis of data generated by at least one server present in each layer. The plurality of servers included in the supply chain data processing device 100 may be stratified, and data of the servers collected in accordance with a hierarchy may be selectively used for implementing a metaverse warehouse.

The supply chain data processing device 100 may interoperate with the metaverse warehouse implementation device 120, and the metaverse warehouse implementation device 120 may implement a metaverse warehouse in consideration of the supply chain data received from the supply chain data processing device 100.

The metaverse warehouse implementation device 120 may include a product warehousing processor 122, a product storage processor 124, a product unstoring processor 126, and a metaverse implementer 128. The metaverse warehouse implementation device 120 may provide metaverse environments for a plurality of actual warehouses.

The product warehousing processor 122 may be intended to warehouse products in a metaverse warehouse. The product warehousing processor 122 may generate product warehousing data for performing a warehousing action in the metaverse warehouse.

The product storage processor 124 may be intended to store products in a metaverse warehouse. The product storage processor 124 may generate product storage data for performing a storage action in the metaverse warehouse.

The product unstoring processor 126 may be intended to process unstoring of products in a metaverse warehouse. The product unstoring processor 126 may generate product unstoring data for performing an unstoring action in the metaverse warehouse.

The metaverse implementer 128 may implement a metaverse warehouse 150 on the basis of the data generated by the product warehousing processor 122, the product storage processor 124, and the product unstoring processor 126.

The metaverse warehouse 150 is obtained by implementing an actual warehouse in a metaverse, and the product warehousing processor 122, the product storage processor 124, and the product unstoring processor 126 may be implemented to check product warehousing, storage, and unstoring in the metaverse in real time on the basis of hardware such as a camera, a sensor, etc.

The blockchain data processor 140 may be intended for processing data that is generated by each of the supply chain data processing device 100 and the metaverse warehouse implementation device 120 to be uploaded to a blockchain. According to a setting, the blockchain data processor 140 may transmit data generated by each of the supply chain data processing device 100 and the metaverse warehouse implementation device 120 to the blockchain network 160 in real time or may package the data and periodically transmit the packaged data to the blockchain network 160.

Also, the blockchain data processor 140 may transmit a smart contract for data processing on the blockchain to the blockchain network 160 and perform data processing on the blockchain on the basis of the smart contract. The smart contract may be generated on the basis of an action of the metaverse warehouse implementation device 120.

The blockchain network 160 may be intended for recording and processing data generated by the supply chain data processing device 100 and the metaverse warehouse implementation device 120 on the blockchain.

Figure 2:
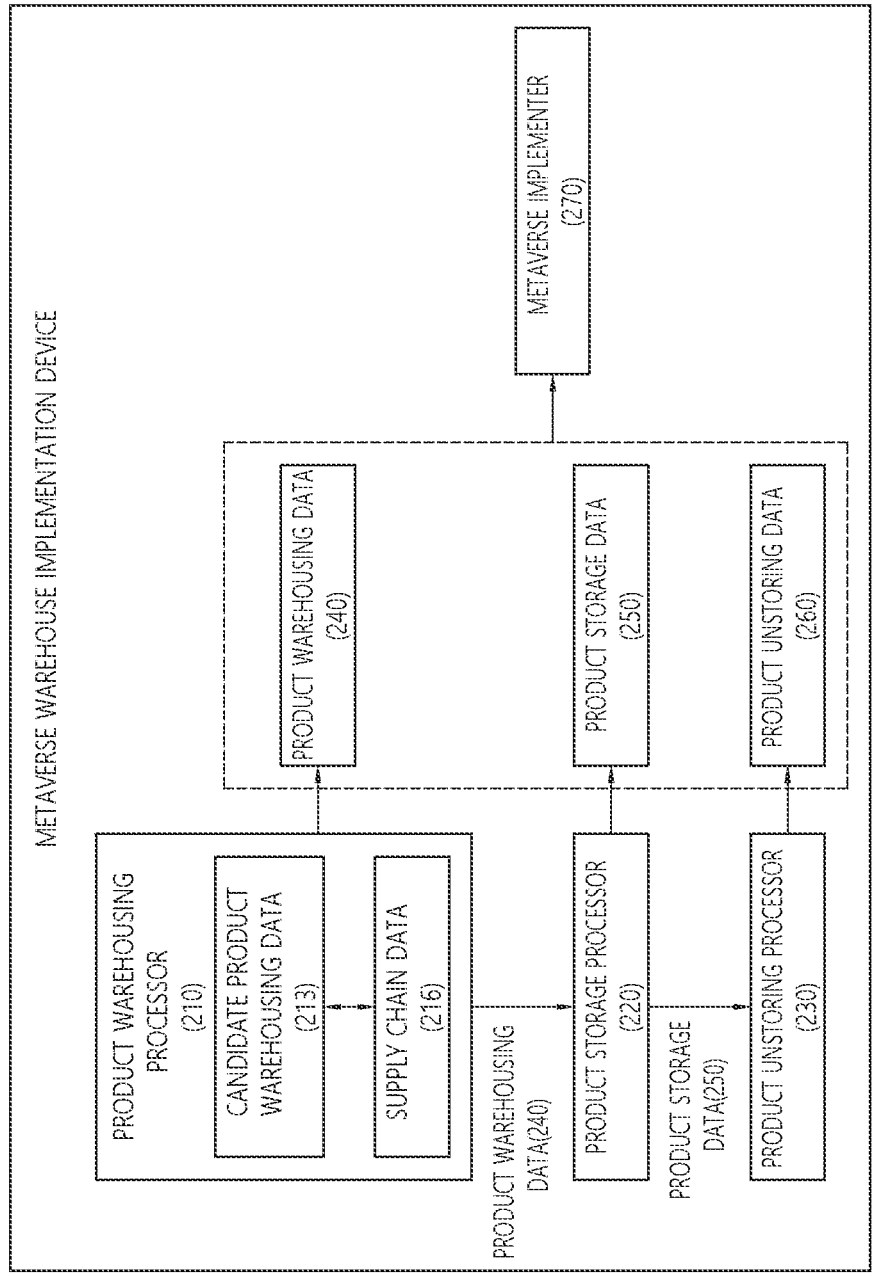
FIG. 2 is a conceptual diagram illustrating an operation of a metaverse warehouse implementation device according to an exemplary embodiment of the present invention.

FIG. 2 is a conceptual diagram illustrating an operation of a metaverse warehouse implementation device according to an exemplary embodiment of the present invention.

FIG. 2 shows a method for a metaverse warehouse implementation device to implement a metaverse warehouse.

Referring to FIG. 2, the metaverse warehouse implementation device may include a product warehousing processor 210, a product storage processor 220, a product unstoring processor 230, and a metaverse implementer 270.

The product warehousing processor 210 may be intended to warehouse products in a metaverse warehouse. When supply chain data 216 for warehousing in a warehouse is generated by the supply chain data processing device, the product warehousing processor 210 compares the supply chain data 216 with candidate product warehousing data 213. When the supply chain data 216 matches the candidate product warehousing data 213, the product warehousing processor 210 may generate product warehousing data 240.

First, to determine whether the supply chain data 216 matches the candidate product warehousing data 213, the product warehousing processor 210 may generate the candidate product warehousing data 213 on the basis of an object recognition technology, such as a vision technology and/or a sensor technology, when products are warehoused. The candidate product warehousing data 213 may include information on the products warehoused in a warehouse, information on the number of products, information on product quality, information on product prices, etc.

When the candidate product warehousing data 213 matches the supply chain data 216, the product warehousing processor 210 may finally determine that the supply chain data 216 matches the candidate product warehousing data 213 and generate the product warehousing data 240. The product warehousing data 240 may be transmitted to the blockchain data processor and stored on the blockchain network. Also, the product warehousing data 240 may be transmitted to the product storage processor 220 for product storage processing after warehousing and may be transmitted to the metaverse implementer 270 so that a warehousing action is performed for the products warehoused in the metaverse warehouse. Also, the product warehousing data 240 may be transmitted to the supply chain data processing device so that a data update may be performed in the supply chain.

The product storage processor 220 may be intended for product storage processing in a metaverse warehouse. The products warehoused in the warehouse may be stored therein before sale. A service for checking a product stored in the warehouse may be provided in the metaverse warehouse.

As product storage data 250 of the warehoused products, the product storage processor 220 may generate information required for product storage such as product storage start dates, product storage locations, product storage environments, time limits for product storage, price fluctuations in accordance with product storage periods, etc. The warehouse may be implemented so that information on the products stored in the warehouse may be checked in real time through a vision technology and/or a sensing technology implemented in the warehouse.

The product storage data 250 may be transmitted to the blockchain data processor and stored on the blockchain network. Also, the product storage data 250 may be transmitted to the product unstoring processor 230 for product unstoring after product storage and may be transmitted to the metaverse implementer 270 so that a storage action is performed for the products warehoused in the metaverse warehouse. Also, the product storage data 250 may be transmitted to the supply chain data processing device so that a data update may be performed in the supply chain.

The product unstoring processor 230 may be intended for product unstoring in a metaverse warehouse. When a product stored in the warehouse is sold, the product may be unstored. When the product is unstored, a service for checking unstoring of the product stored in the warehouse may be provided in the metaverse warehouse.

As product unstoring data 260, the product unstoring processor 230 may generate information required for product unstoring such as a product unstoring start date, a product unstoring location, a product factory price, a product delivery address, etc. The warehouse may be implemented so that information on unstoring of the product in the warehouse may be checked in real time through the vision technology and/or the sensing technology implemented in the warehouse.

The product unstoring data 260 may be transmitted to the blockchain data processor and stored on the blockchain network. Also, the product unstoring data 260 may be transmitted to the metaverse implementer 270 so that an unstoring action is performed for the product stored in the metaverse warehouse. Further, the product unstoring data 260 may be transmitted to the supply chain data processing device so that a data update may be performed in the supply chain.

The metaverse implementer 270 may implement the metaverse warehouse on the basis of vision data, sensing data, three-dimensional (3D) warehouse structure data, the product warehousing data 240, the product storage data 250, and the product unstoring data 260 generated by a vision sensor device installed in the warehouse. The metaverse warehouse is implemented to enable a user to check product warehousing, storage, and unstoring at the warehouse in the metaverse. A user can access the metaverse warehouse to check a state of a product without visiting the warehouse. A new service (e.g., a financial service) can be provided on the basis of such a metaverse warehouse.

Since it is difficult to check a product warehoused in a warehouse, existing financial services are merely based on sales credit rather than products. However, when it is possible to check actual stored products through a metaverse warehouse, financial services can be extended to be secured by products, and product sellers can be provided with the extended financial services.

Figure 3:
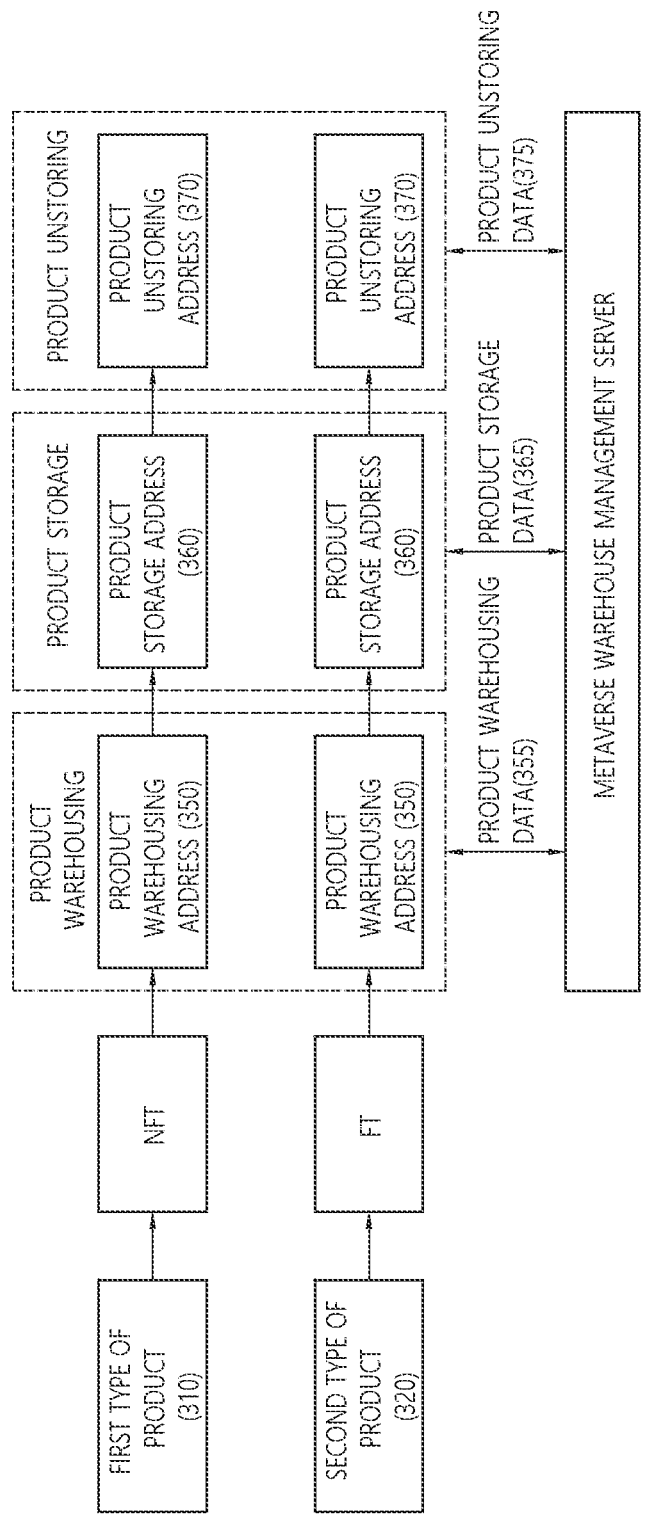
FIG. 3 is a conceptual diagram illustrating a data processing method of a metaverse warehouse implementation device according to an exemplary embodiment of the present invention.

FIG. 3 is a conceptual diagram illustrating a data processing method of a metaverse warehouse implementation device according to an exemplary embodiment of the present invention.

FIG. 3 shows a method of matching product warehousing data, product storage data, and product unstoring data generated from a metaverse warehouse with each other.

After product warehousing data is generated, the product warehousing data is required to match product storage data, and after product storage data is generated, the product storage data is required to match product unstoring data.

Different product warehousing data may be generated depending on types of products. A product which requires individual product identification may be a first-type product 310, and a product which does not require individual product identification may be a second-type product 320. The first-type product 310 may be generated on the basis of a non-fungible token (NFT) and managed with the NFT, and the second-type product 320 may be generated on the basis of a fungible token (FT) and managed with the FT. Expensive products and products requiring specification may be defined and managed as the first-type product 310, and other products may be defined and managed as the second-type product 320.

For example, a television (TV) having a serial number of XXXXXX may be defined as the first-type product 310, and one NFT corresponding to the TV having the serial number of XXXXXX may be issued. 1,000 pencils may be defined as the second-type products 320, and 1,000 FTs corresponding to the pencils may be issued.

To manage product warehousing data, product storage data, and product unstoring data in a blockchain, a product warehousing address 350 corresponding to product warehousing, a product storage address 360 corresponding to product storage, and a product unstoring address 370 corresponding to product unstoring may be present. Operations corresponding to product warehousing, storage, and unstoring in the metaverse may be checked on the basis of movement of NFTs and FTs corresponding to products in the blockchain.

Also, product warehousing data 355, product storage data 365, and product unstoring data 375 corresponding to the NFTs and FTs may be stored in a metaverse warehouse management server, and hash values of the product warehousing data 355, product storage data 365, and product unstoring data 375 may be recorded on the blockchain so that the authenticity of data can be checked.

Figure 4:
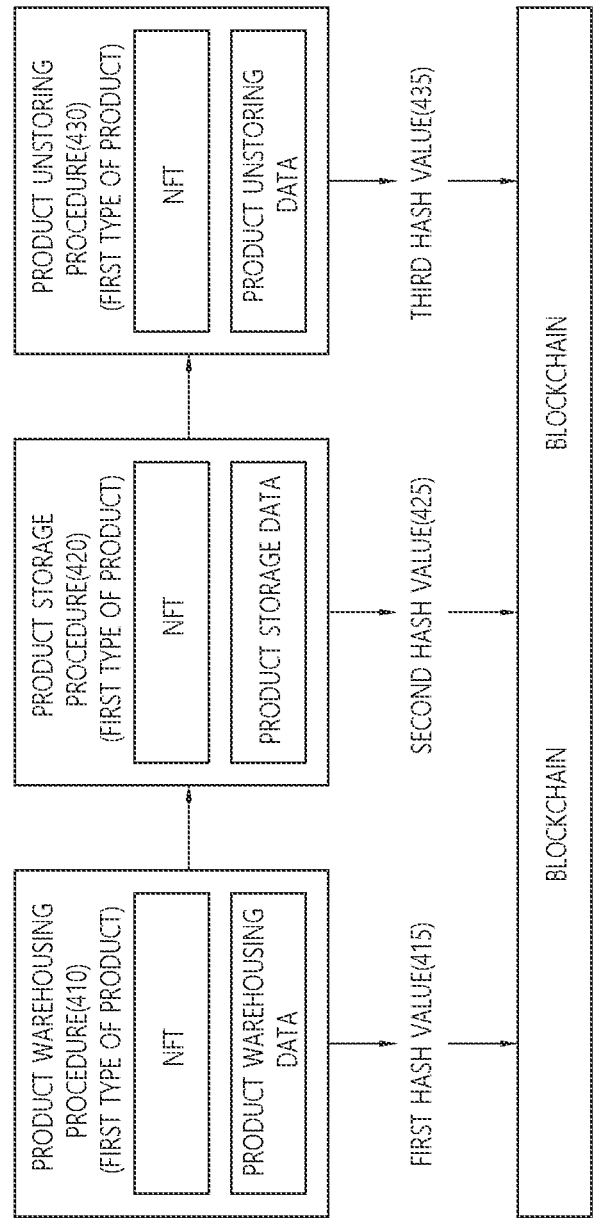
FIG. 4 is a conceptual diagram illustrating a method of managing product data in a blockchain according to an exemplary embodiment of the present invention.

FIG. 4 is a conceptual diagram illustrating a method of managing product data in a blockchain according to an exemplary embodiment of the present invention.

FIG. 4 shows an NFT-based trading method for a first-type product.

Referring to FIG. 4, management of NFTs and management of product warehousing data based on a blockchain for product warehousing, product storage, and product unstoring is illustrated.

(1) Product Warehousing Procedure (First-Type Product) 410

When a product is warehoused, an NFT for the product may be generated from a product warehousing address. When the NFT for the product is generated, the NFT may be matched with product warehousing data. The NFT and the product warehousing data may be generated as a first hash value 415, and the first hash value 415 may be recorded on a blockchain.

(2) Product Storage Procedure (First-Type Product) 420

When the product is stored, the NFT for the product may be transmitted to a product storage address. When the NFT is moved to the product storage address, the NFT may be matched with product storage data. The NFT and the product storage data may be generated as a second hash value 425, and the second hash value 425 may be recorded on the blockchain.

(3) Product Unstoring Procedure (First-Type Product) 430

When the product is unstored, the NFT for the product may be transmitted to a product unstoring address. When the NFT is moved to the product unstoring address, the NFT may be matched with product unstoring data. The NFT and the product unstoring data may be generated as a third hash value 435, and the third hash value 435 may be recorded on the blockchain.

The product warehousing address, the product storage address, and the product unstoring address may be wallet addresses that generate transactions on the blockchain. Movement of the first-type product in a metaverse warehouse can be tracked on the basis of movement of the NFT for the product and the hash values, and users can accurately check movement of the product in the metaverse warehouse.

This method may be termed a "single NFT product management method."

As another method, no hash value may be generated, and NFTs based on product warehousing data, product storage data, and product unstoring data may be generated in a product warehousing procedure, a product storage procedure, and a product unstoring procedure, respectively.

More specifically, in a product warehousing operation, an NFT (product warehousing) may be generated on the basis of the product warehousing data. In a product storage operation, an NFT (product storage) may be generated on the basis of the product storage data and the NFT (product warehousing). In a product unstoring operation, an NFT (product unstoring) may be generated on the basis of the product unstoring data and the NFT (product storage).

This method may be called an "operation-specific NFT product management method."

When it is necessary to continuously manage an NFT in a supply chain after unstoring from a metaverse warehouse, the single NFT product management method may be used. Otherwise, when it is necessary to manage a product in a metaverse warehouse only, the operation-specific NFT product management method may be used. For example, an NFT may be given to a product, such as a luxury item, in the production operation, and after the product is sold, an NFT-based secondhand deal may be required. In this case, the single-NFT product management method may be used.

Figure 5:
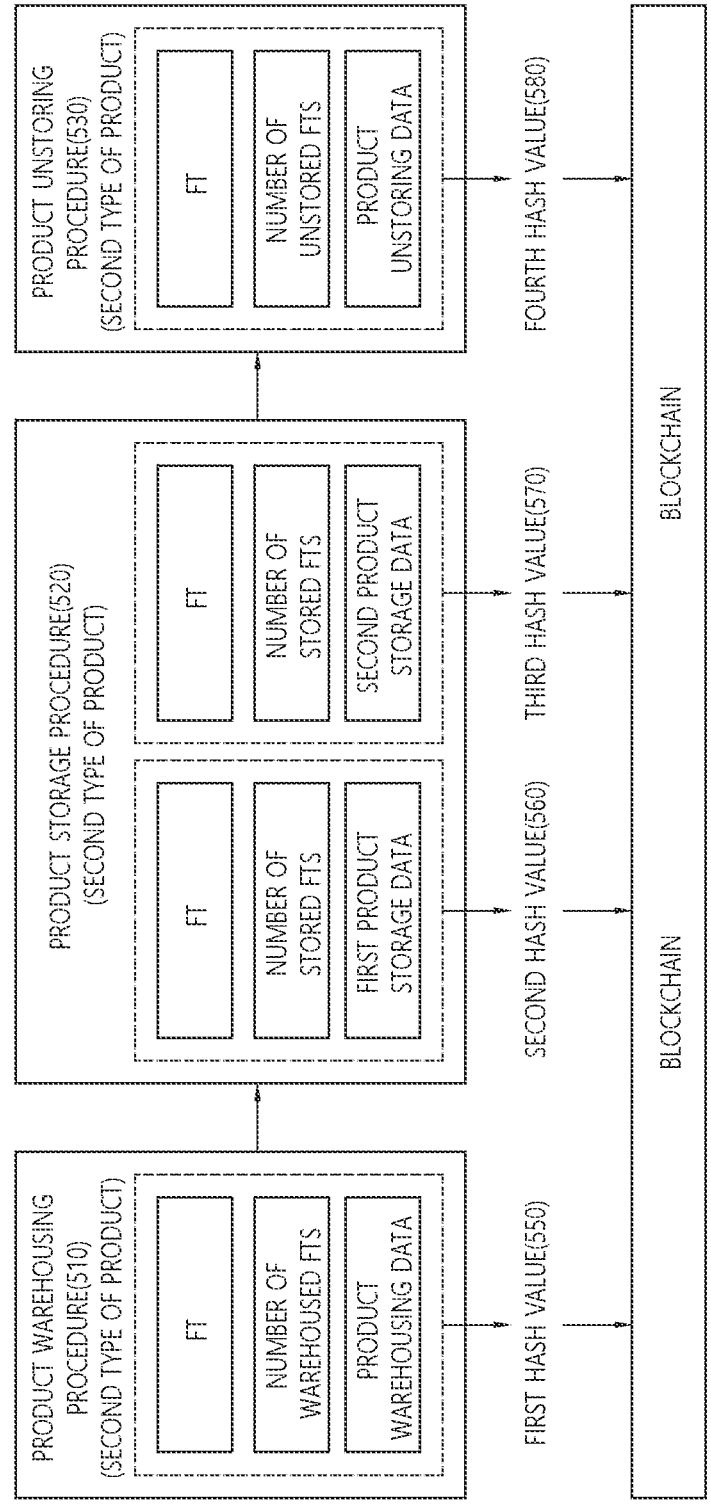
FIG. 5 is a conceptual diagram illustrating a method of managing product data on a blockchain according to an exemplary embodiment of the present invention.

FIG. 5 is a conceptual diagram illustrating a method of managing product data on a blockchain according to an exemplary embodiment of the present invention.

FIG. 5 shows an FT-based trading method for a second-type product.

Referring to FIG. 5, management of FTs and management of product warehousing data based on a blockchain for product warehousing, product storage, and product unstoring is illustrated.

Product Warehousing Procedure (Second-Type Product) 510

When a product is warehoused, an FT for the product may be generated from a product warehousing address. For example, when products are 1,000 units of shampoo, 1,000; FTs may be generated. The FTs may be matched with product warehousing data. The FTs, the number of FTs, and the product warehousing data may be generated as a first hash value 550, and the first hash value 550 may be recorded on a blockchain.

(2) Product Storage Procedure (Second-Type Product) 520

When the products are stored, the FTs for the products may be transmitted to a product storage address. The plurality of FTs may be stored in different storage places. When the storage locations or the like are changed, different storage data may be generated, or the plurality of FTs may be transmitted to different product storage addresses so that the change may be reflected in product storage.

For example, 1,000 FTs may be generated for 1,000 units of shampoo. 500 units of shampoo may be stored in a first storage place, and the other 500 units of shampoo may be stored in a second storage place.

In this case, the former 500 FTs may be transmitted to a first product storage address, and first product storage data may be generated. The latter 500 FTs may be transmitted to a second product storage address, and second product storage data may be generated.

A second hash value 560 may be generated from (the former 500 FTs, the first product storage address, and the first product storage data), and a third hash value 570 may be generated from (the latter 500 FTs, the second product storage address, and the second product storage data). The second hash value 560 and the third hash value 570 may be recorded on the blockchain.

(3) Product Unstoring Procedure (Second-Type Product) 530

When the products are unstored, the FTs for the products may be transmitted to a product unstoring address. Like in the product storage procedure, each of the 1,000 FTs may be moved to the product unstoring address in accordance with an unstoring quantity, and when the unstoring quantity of FTs are moved, the FTs may be matched with product unstoring data. The unstoring quantity of FTs to be unstored and the product unstoring data may be generated as a fourth hash value 580, and the fourth hash value 580 may be recorded on the blockchain.

The product warehousing address, the product storage address, and the product unstoring address may be wallet addresses that generate transactions on the blockchain. Movement of the second-type product in a metaverse warehouse can be tracked on the basis of movement of the FTs for the products and the hash values, and users can accurately check movement of the products in the metaverse warehouse.

Only a single FT product management method may be used for FT-based products.

Figure 6:
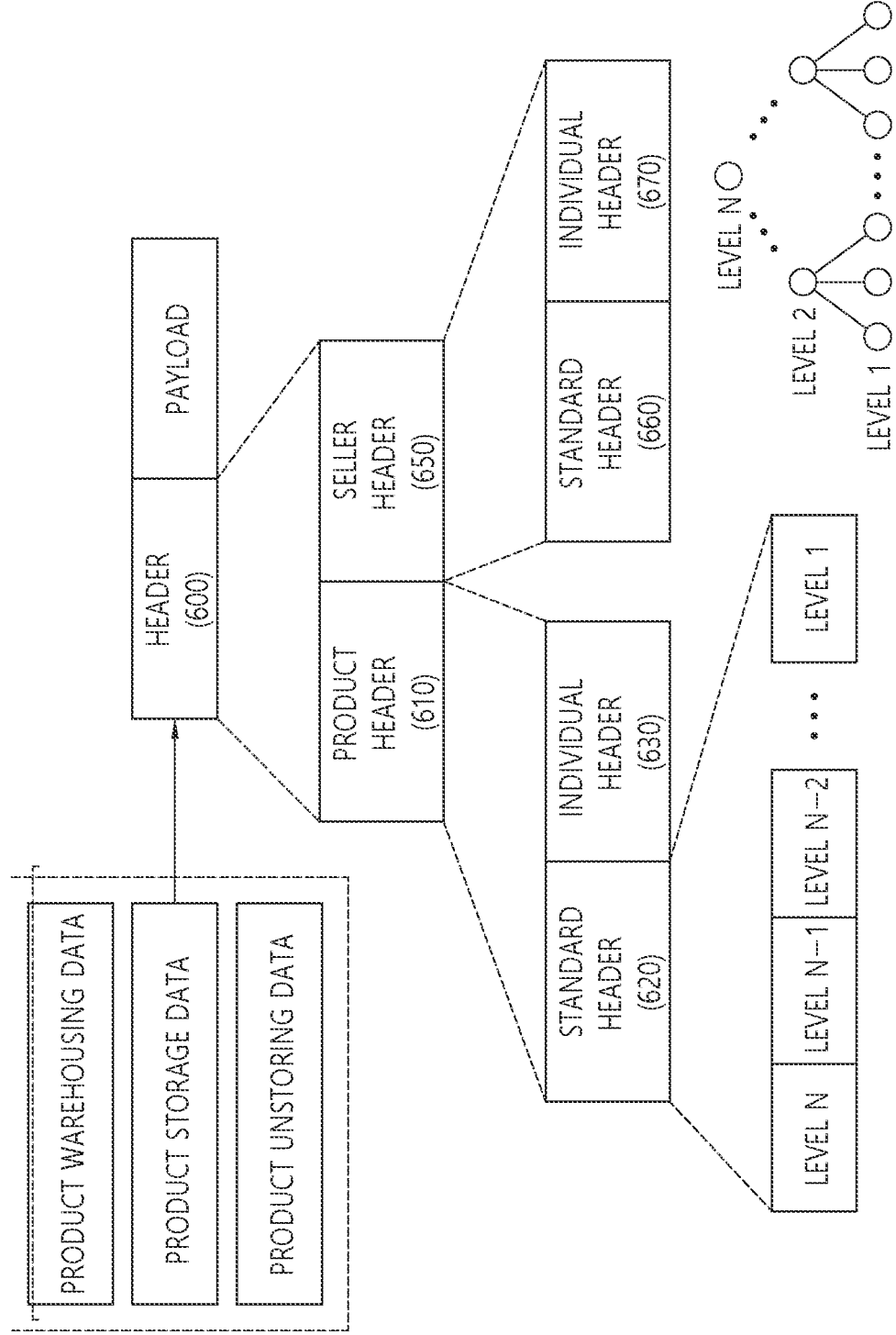
FIG. 6 is a conceptual diagram illustrating a data processing method for implementing a metaverse warehouse according to an exemplary embodiment of the present invention.

FIG. 6 is a conceptual diagram illustrating a data processing method for implementing a metaverse warehouse according to an exemplary embodiment of the present invention.

FIG. 6 shows a data processing method based on a header for implementing a metaverse warehouse.

Referring to FIG. 6, a metaverse warehouse may be implemented for a whole actual warehouse or may be implemented for each user or each user group of the metaverse warehouse.

For example, a metaverse warehouse for seller A may be provided so that seller A warehouses, stores, and unstores sale products, or a metaverse warehouse for a seller group may be provided so that a seller group including a plurality of sellers warehouses, stores, and unstores sale products.

Alternatively, a metaverse warehouse may be implemented on the basis of a specific sale product or sale product group rather than a seller.

To provide metaverse warehouses for such a variety of variables (sellers, products, etc.), product warehousing data, product storage data, and product unstoring data may be divided and processed.

Classification codes for data classification, such as product seller information, product seller group information, product information, product group information, etc., may be given to a header 600 of each of product warehousing data, product storage data, and product unstoring data. Header levels, such as classification codes of product seller information, product seller group information, product information, product group information, etc., may be determined in accordance with an implementation level of a metaverse warehouse. Various header levels may be adaptively determined in accordance with characteristics of the metaverse warehouse.

The metaverse warehouse of the present invention may correspond to an actual warehouse on a one-to-one basis or correspond to a partial area obtained by partitioning an actual warehouse. Also, the metaverse warehouse may be implemented by integrating a plurality of actual warehouses. Header levels each corresponding to input product warehousing data, product storage data, and product unstoring data may be adaptively set in accordance with characteristics (handling items, sellers, and a warehouse size) of the metaverse warehouse, and a level of the implemented metaverse warehouse may vary depending on the characteristics. A header data level may be set to be extendable thereafter.

The header 600 of the product warehousing data, the product storage data, or the product unstoring data may be generally divided into a product header 610 and a seller header 650. Also, each of the product header 610 and the seller header 650 may be divided into a standard header 620 and an individual header 630.

Each of the standard header 620 and the individual header 630 of the product header 610 may be set to n header levels.

For integration between different actual warehouses in the metaverse, the standard header 620 may include n header levels for product classifications defined as a standard. The individual header 630 may include n header levels for product classifications which are separately defined to manage a metaverse warehouse for a specific warehouse. A plurality of actual warehouses may be implemented in an integrative manner as a metaverse warehouse on the basis of the standard header 620, and the individual header 630 may be defined so that individual metaverse warehouses may be adaptively implemented as necessary.

n header levels of each of the standard header 620 and the individual header 630 in the product header 610 may have a hierarchical structure, and each of the n header levels may have a more comprehensive concept when set to a higher layer. For example, a first header level of the standard header 620 may correspond to pencils, a second header level may correspond to stationery, a third header level may correspond to industrial products, and the like. In other words, a higher layer may be set to a wider concept including the corresponding product. n header levels corresponding to the product header 610 may vary depending on a setting, and a change may be made to the header 600 in accordance with such a change.

Likewise, each of a standard header 660 and an individual header 670 of the seller header 650 may be set to m header levels. m header levels of each of the standard header 660 and the individual header 670 in the seller header 650 may have a hierarchical structure, and each of the m header levels may have a more comprehensive concept when set to a higher layer. For example, a first header level of the standard header 660 may correspond to seller A, a second header level may correspond to a first seller group, a third header level may correspond to a second seller group, and the like. In other words, a higher layer may be set to a wider concept including the corresponding seller or seller group. m header levels corresponding to the seller header 650 may vary depending on a setting, and a change may be made to the header 600 in accordance with such a change.

A level of a header that is not set for the product header and the seller header 650 as necessary may be left without any setting.

Also, according to an exemplary embodiment of the present invention, the standard headers 620 and 660 may be adjusted on the basis of use of the individual headers 630 and 670.

For example, information on a header level which is frequently used in practice may be reflected in consideration of the individual headers 630 and 670 used in each metaverse warehouse so that the standard headers 620 and 660 may be adjusted in accordance with actual classifications in the warehousing business.

Also, according to an exemplary embodiment of the present invention, the header 600 of each of the product warehousing data, the product storage data, and the product unstoring data may further include a metaverse warehouse header which includes identification information of a metaverse warehouse and relationship information between metaverse warehouses. The metaverse warehouse header may be used for data transmission in consideration of the relationship between metaverse warehouses.

Figure 7:
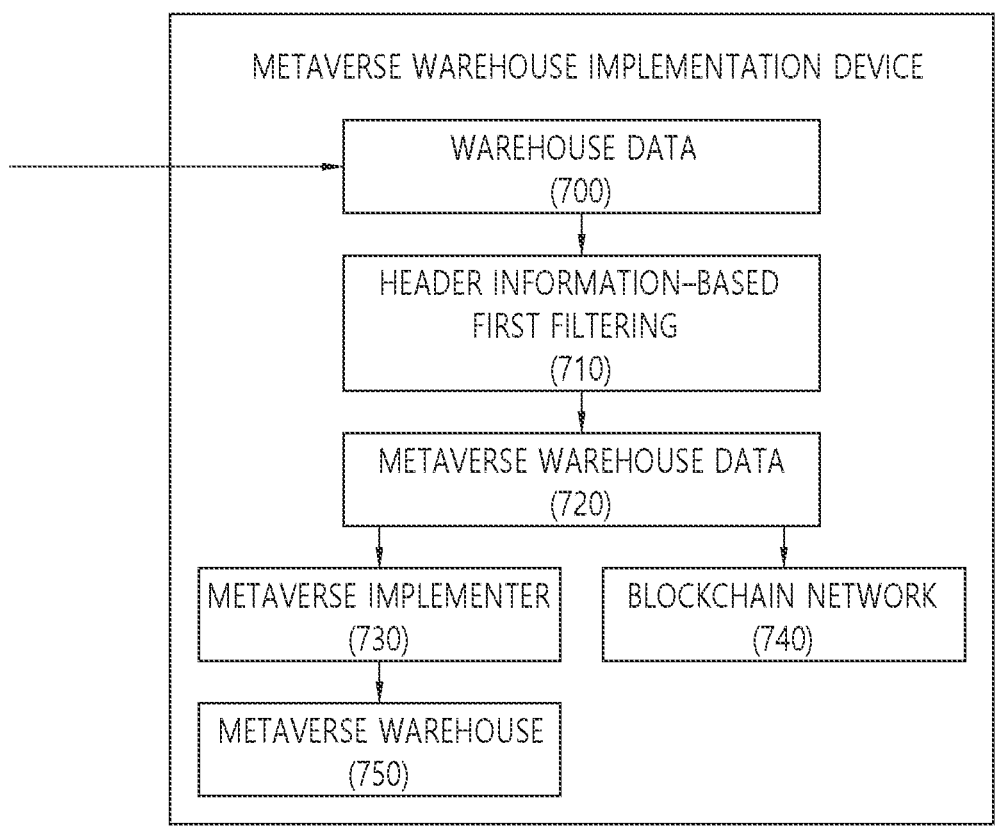
FIG. 7 is a conceptual diagram illustrating a data processing method for implementing a metaverse warehouse according to an exemplary embodiment of the present invention.

FIG. 7 is a conceptual diagram illustrating a data processing method for implementing a metaverse warehouse according to an exemplary embodiment of the present invention.

FIG. 7 shows a method of processing product warehousing data, product storage data, and product unstoring data to implement a metaverse warehouse.

Referring to FIG. 7, for convenience of description, product warehousing data, product storage data, and product unstoring data will be called "warehouse data 700" for implementing a metaverse warehouse.

A metaverse warehouse implementation device may classify data as blockchain record data to be recorded on a blockchain network 740 or metaverse warehouse implementation data for implementing a metaverse warehouse on the basis of header information of the warehouse data 700.

The metaverse warehouse implementation device may perform header information-based first filtering 710. First, the warehouse data 700 that is currently not required for implementing a metaverse warehouse 750 may be filtered out in consideration of the metaverse warehouse 750 to be implemented. For example, when the metaverse warehouse 750 is not requested for seller B and product X, the warehouse data 700 about seller B and product X may be filtered out.

The warehouse data 700 remaining after the first filtering may be metaverse warehouse data 720, and a metaverse implementer 730 of the metaverse warehouse implementation device may generate the metaverse warehouse 750 by classifying the metaverse warehouse data 720.

For example, when it is necessary to implement the metaverse warehouse 750 for seller A and seller group A, the metaverse implementer 730 may classify the metaverse warehouse data 720 corresponding to each of seller A and seller group A through header filtering to generate the metaverse warehouse 750.

Also, the metaverse warehouse implementation device may generate hash values by grouping the metaverse warehouse data 720 for recording on the blockchain and store the generated hash values on the blockchain network 740. In the present invention, time units may be set for each metaverse warehouse 750, and hash values of the metaverse warehouse data 720 collected in the time units may be recorded on the blockchain network 740.

For example, first time units and second time units may be set for seller A and seller group A, respectively. The metaverse warehouse data 720 about seller A generated in the first time units may be grouped and generated as hash values together with identification information of seller A. The generated hash values may be stored on the blockchain network 740. Likewise, the metaverse warehouse data 720 about seller group A generated in the second time units may be grouped and generated as hash values together with identification information of seller group A. The generated hash values may be stored on the blockchain network 740. The first time units and the second time units may be adjusted on the basis of a generation speed of the metaverse warehouse data 720. When the generation speed of the metaverse warehouse data 720 is higher, time units may be set to be shorter.

According to an exemplary embodiment of the present invention, among metaverse warehouse data, metaverse warehouse data (time) in which time is highly regarded may not be grouped in time units but may be stored on the blockchain network first. For example, among product warehousing data, product storage data, and product unstoring data, data about frozen food, refrigerated food, or products having an expiration date may not be grouped in time units but may be stored on the blockchain upon generation.

In this way, a desired metaverse warehouse environment can be adaptively created in accordance with settings, and the authenticity of data can be ensured on the basis a blockchain.

Also, according to an exemplary embodiment of the present invention, data transmission can be performed by considering the relationship between metaverse warehouses for efficient data processing. For example, data for metaverse warehouse 1 may be data for metaverse warehouse 2 and metaverse warehouse 3 simultaneously including metaverse warehouse 1. Also, data for metaverse warehouse 2 may be data for metaverse warehouse 3 including metaverse warehouse 2. Accordingly, to prevent overlapping data processing, a metaverse warehouse layer header in which the layers of metaverse warehouses included in a header of data generated are taken into consideration may be included, and selective transmission can be performed by considering the relationship between metaverse warehouses on the basis of the metaverse warehouse layer header.

Figure 8:
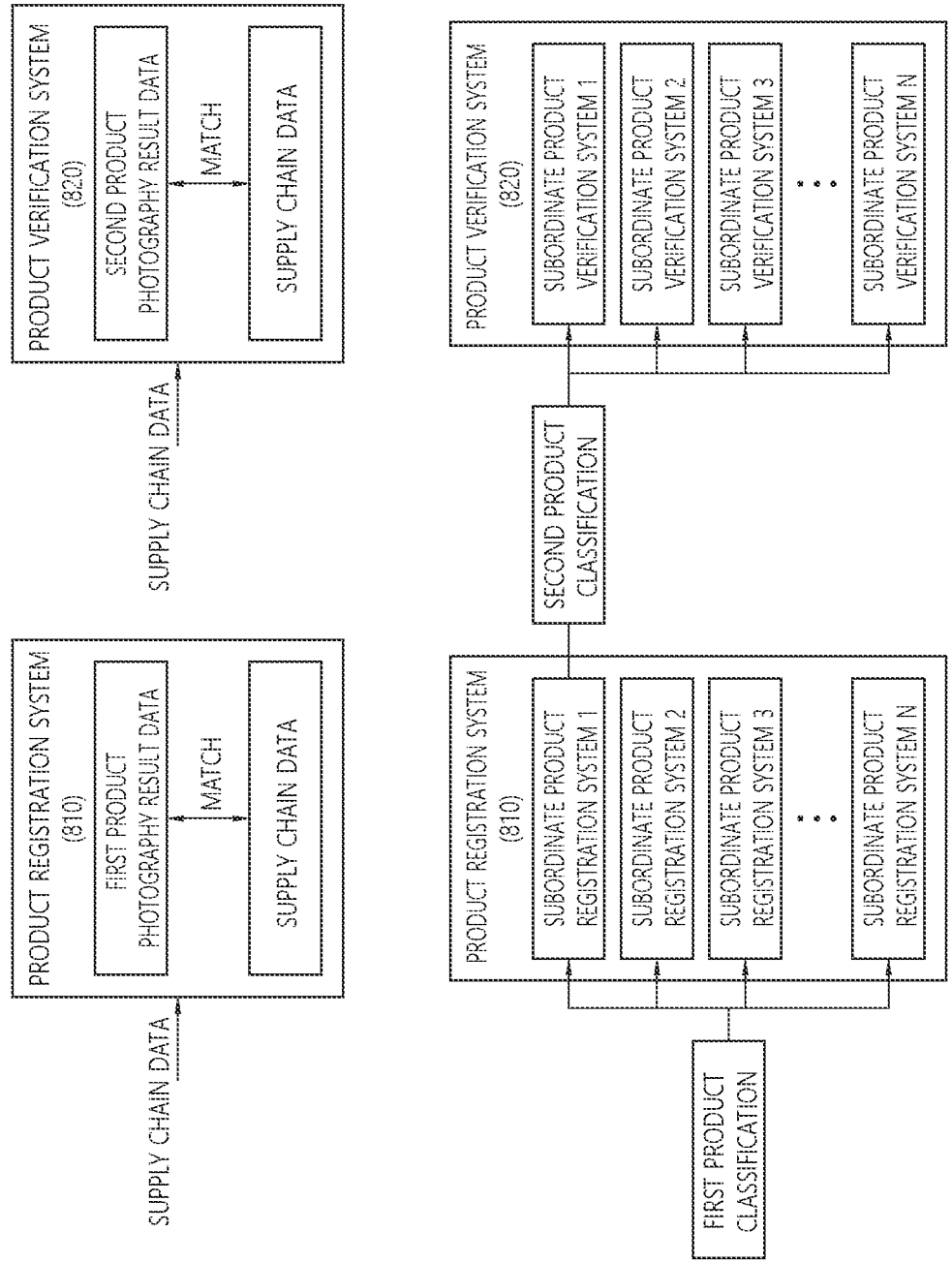
FIG. 8 is a conceptual diagram illustrating a method of registering and verifying a product in a metaverse warehouse according to an exemplary embodiment of the present invention.

FIG. 8 is a conceptual diagram illustrating a method of registering and verifying a product in a metaverse warehouse according to an exemplary embodiment of the present invention.

FIG. 8 shows a procedure for registering and verifying a product warehoused in a warehouse to implement a metaverse warehouse.

Referring to FIG. 8, product registration and product verification may be performed through a product registration system 810 and a product verification system 820.

The product registration system 810 and the product verification system 820 may be included in a metaverse warehouse implementation system.

For product registration, supply chain data generated by a supply chain data processing device may be matched with warehoused products. For example, warehoused products may be photographed on the basis of the product registration system 810 implemented in a warehouse, and first product photography result data acquired through a first product photography device may be matched with the supply chain data. Quantitative information of the products may be checked through product registration. For example, quantitative information, such as the number of products, may be checked.

Product verification may be a procedure for checking qualitative data, such as product quality, in the supply chain data. The warehoused products may be verified through the product registration system 810 implemented in the warehouse. Second product photography result data acquired through a second product photography device of the product verification system 820 may be matched with the supply chain data.

In the warehouse, the product registration system 810 and the product verification system 820 may be present. Product registration and product verification in accordance with products may be performed differently. Accordingly, to perform a product registration procedure in accordance with classified products, the product registration system 810 may include a plurality of subordinate product registration systems. Likewise, the product verification system 820 may include a plurality of subordinate product verification systems to perform product verification in accordance with classified products after the product registration procedure by the plurality of subordinate product registration systems.

Product registration is performed through first product classification in the product registration system 810, and product verification may be performed through second product classification in the product verification system 820.

To implement a metaverse warehouse, the product registration system 810 and the product verification system 820 in which products to be warehoused in the metaverse warehouse are taken into consideration may be implemented in the warehouse. Products warehoused in the warehouse are primarily classified and located in the plurality of subordinate product registration systems, and a product registration procedure may be performed by each of the plurality of subordinate product registration system. After the product registration procedures are finished, product verification procedures for the plurality of products may be performed by the plurality of subordinate product verification systems.

Figure 9:
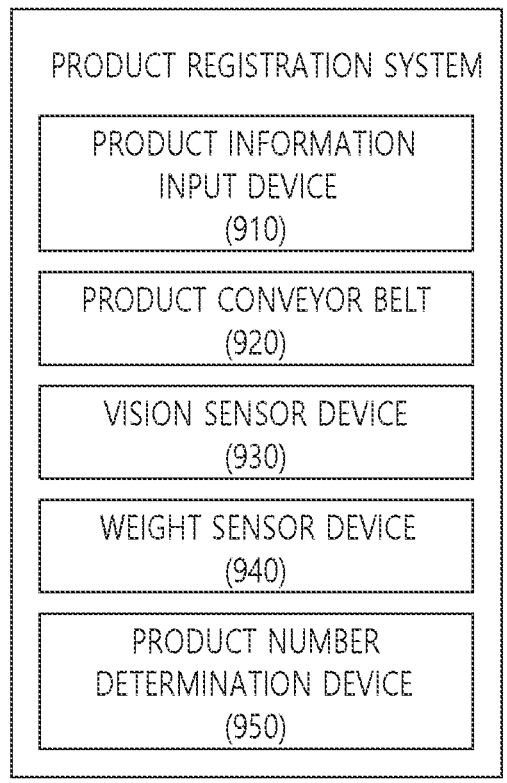
FIG. 9 is a conceptual diagram illustrating a product registration system according to an exemplary embodiment of the present invention.

FIG. 9 is a conceptual diagram illustrating a product registration system according to an exemplary embodiment of the present invention.

FIG. 9 shows the product registration system for a product registration procedure.

Referring to FIG. 9, the product registration system may include a product information input device 910, a product conveyor belt 920, a vision sensor device 930, a weight sensor device 940, and a product number determination device 950. The product registration system may be intended to determine products and quantitative information of the products.

The product information input device 910 may be intended to input product information. The product information is information corresponding to supply chain data and may include product identification information, product quantity information, product weight information, etc.

The product conveyor belt 920 may be intended for product movement based on a conveyor belt. The products may be moved through the product conveyor belt 920, and product registration may be performed on the basis of data generated by the vision sensor device 930 and the weight sensor device 940 disposed in a moving path of the products.

The vision sensor device 930 may photograph the products to check the number of products on the basis of image information. The products may be moved through the product conveyor belt 920, and the vision sensor device 930 may photograph the number of input products at various angles. A first product photograph image captured by the vision sensor device 930 may be transmitted to a product number determination device 950.

The weight sensor device 940 may measure weights of the products to check the products on the basis of weight information. The weight sensor device 940 may be provided in the product conveyor belt 920 to sense the weight of a product. The weight sensor device 940 may generate product weight data.

The product number determination device 950 may be intended to determine the number of products on the basis of the first product photograph image and the product weight data. The product number determination device 950 may learn the number of products on the basis of learning of product-specific photograph images and learning of product-specific weight data.

In general, identical products are moved on the basis of identical packages, generated with the same weight, and moved to a warehouse. The product number determination device 950 may perform artificial intelligence learning for determining the number of products through learning of products images, packaged product images, product weights, and packaged product weights. As a result of learning of an artificial intelligence engine, the number of products may be output on the basis of the first product photograph image and the product weight data.

In general, identical products are moved on the basis of identical packages, generated with the same weight, and moved to a warehouse. The product number determination device 950 may perform artificial intelligence learning for determining the number of products through learning of products images, packaged product images, product weights, and packaged product weights. As a result of learning of an artificial intelligence engine, the number of products may be output on the basis of the first product photograph image and the product weight data.

Figure 10:
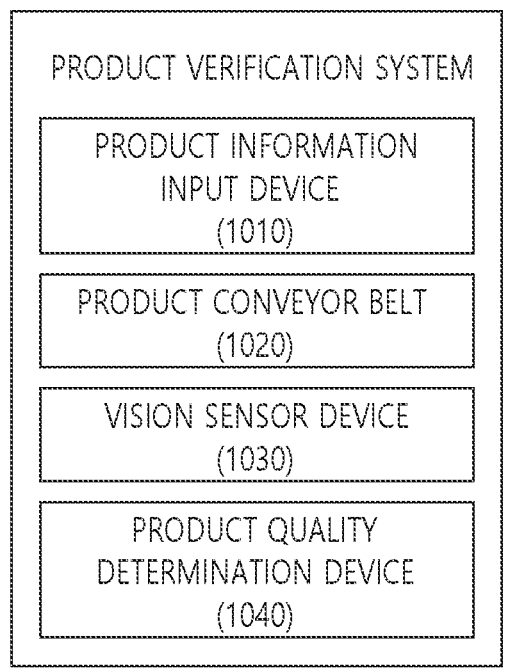
FIG. 10 is a conceptual diagram illustrating a product verification system according to an exemplary embodiment of the present invention.

FIG. 10 is a conceptual diagram illustrating a product verification system according to an exemplary embodiment of the present invention.

FIG. 10 shows the product verification system for a product verification procedure.

Referring to FIG. 10, the product verification system may include a product information input device 1010, a product conveyor belt 1020, a vision sensor device 1030, and a product quality determination device 1040.

The product information input device 1010 may be intended to input product information. The product information is information corresponding to supply chain data and may include product identification information and qualitative information of products such as product quality information and the like.

The product conveyor belt 1020 may be intended for product movement based on a conveyor belt. The products may be moved through the product conveyor belt 1020, and product verification may be performed on the basis of data generated by the vision sensor device 1030 disposed on a moving path of the products.

The vision sensor device 1030 may photograph the products to check the quality of the products on the basis of image information. The products may be moved through the product conveyor belt 1020, and the vision sensor device 1030 may capture images for verifying the quality of the products at various angles. A second product photograph image captured by the vision sensor device 1030 may be transmitted to a product quality determination device 1040.

The vision sensor device 1030 may be a device that may capture a radiograph such as an x-ray picture.

The product quality determination device 1040 may be intended to determine the quality of the products on the basis of the second product photograph image and product weight data registered by the product registration system. The product quality determination device 1040 may learn the quality of the products on the basis of learning of product-specific photograph images and learning of product-specific weight data. To determine product quality, the second product photograph image may include closeup pictures and x-ray radiographs of the products compared to the first product photograph image.

Product quality may be determined through learning of product-specific defect images, which is intended to determine whether there is a defect in the products, and comparison with a reference image.

A product quality determination method will be described below.

Figure 11:
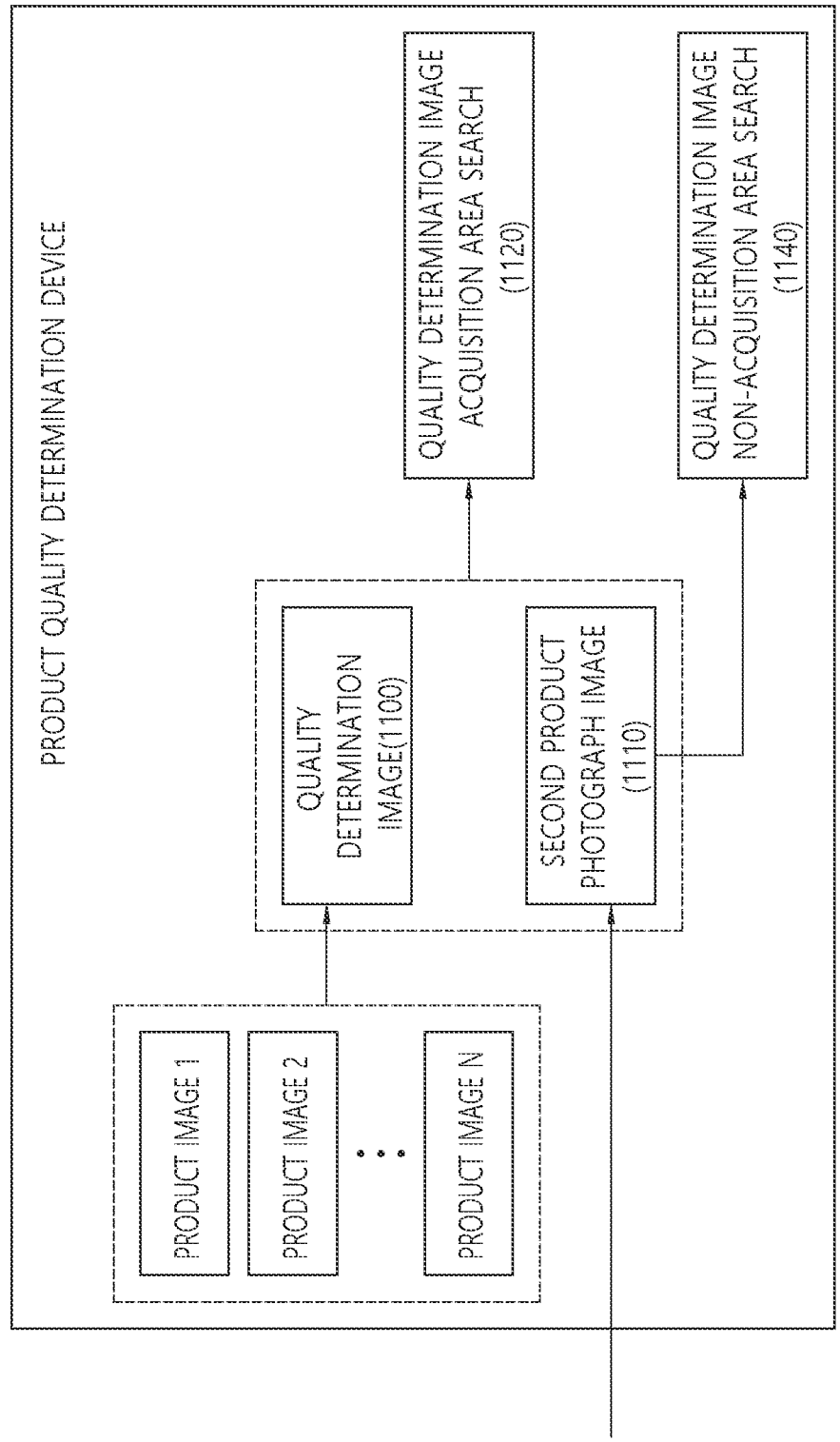
FIG. 11 is a conceptual diagram illustrating a method of determining product quality in a product verification system according to an exemplary embodiment of the present invention.

FIG. 11 is a conceptual diagram illustrating a method of determining product quality in a product verification system according to an exemplary embodiment of the present invention.

FIG. 11 shows a method of determining product quality on the basis of a reference image.

Referring to FIG. 11, the product quality determination device may determine a quality determination image 1100 for the product by combining collected product images.

The collected product images may be images of the product captured at various angles. When the product images are combined, images of all aspects or some portions of the product may be acquired. The product quality determination device may determine the quality determination image 1100 for the product by combining the collected images on the basis of the basic shape of the product. When a plurality of images are collected from the same portion of the product, an image with the best quality may be selected from among the plurality of images as the quality determination image 1100.

A quality determination image acquisition area and a quality determination image non-acquisition area may be classified on the basis of the product. The quality determination image acquisition area may be an area from which an image of the product for quality determination is acquired, and the quality determination image non-acquisition area may be an area from which no image of the product for quality determination is acquired.

The product quality determination device may determine product quality by comparing the quality determination image acquisition area with the second product photograph image. Such determination of product quality may be called a "quality determination image acquisition area search 1120."

Also, the product quality determination device may search the quality determination image non-acquisition area for a quality determination area that influences the quality of the product on the basis of a quality determination algorithm thereof. Such a search may be called a "quality determination image non-acquisition area search 1140."

The quality determination image acquisition area search 1120 may involve matching a criterion point of the quality determination image 1100 with a criterion point of a second photograph image 1110 and determining a threshold angle on the basis of the criterion points so that product quality may be determined.

The quality determination image non-acquisition area search 1140 may involve determining product quality using results of learning based on existing grade determination images that are factors by which the quality of products is determined when the quality determination image 1100 is not present.

The quality determination image acquisition area search 1120 and the quality determination image non-acquisition area search 1140 will be described below according to an exemplary embodiment of the present invention.

Figure 12:
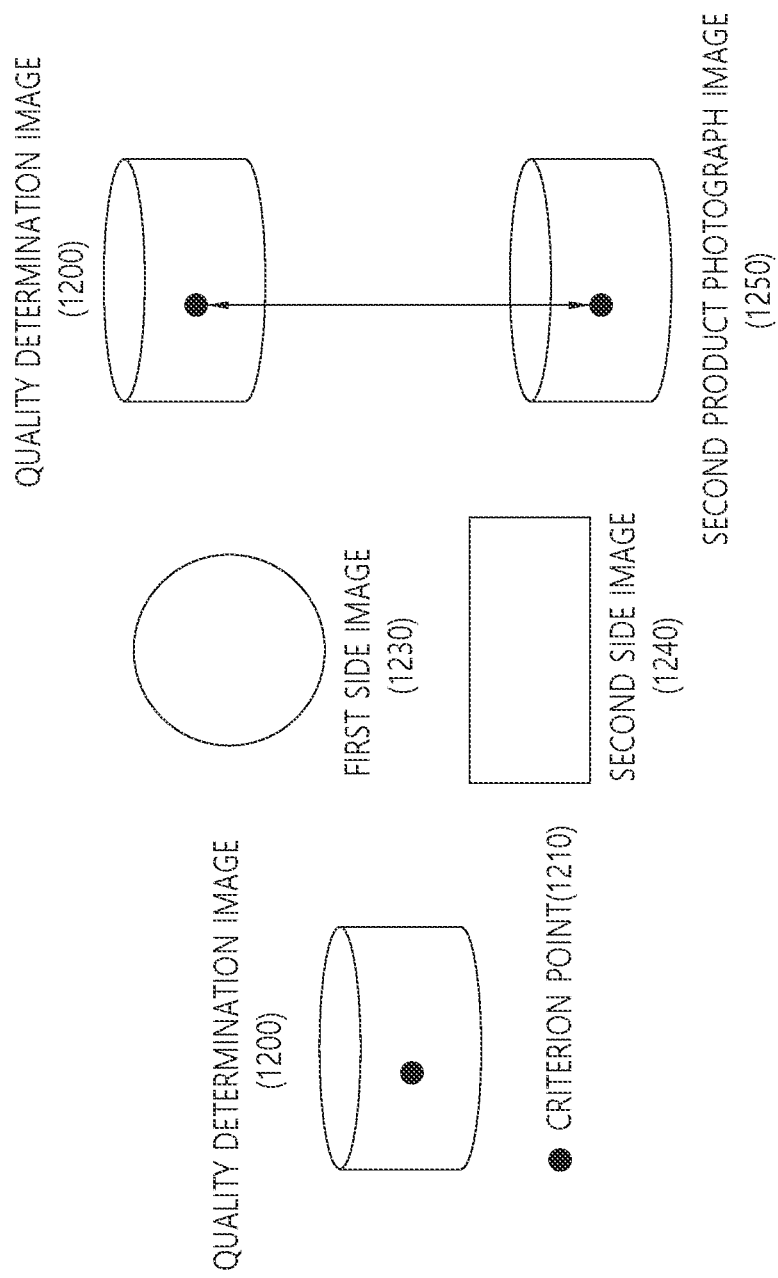
FIG. 12 is a conceptual diagram illustrating an operation of a product quality determination device according to an exemplary embodiment of the present invention.

FIG. 12 is a conceptual diagram illustrating an operation of a product quality determination device according to an exemplary embodiment of the present invention.

FIG. 12 shows a quality determination image acquisition area search method for a product quality determination device to determine the quality of a product.

Referring to FIG. 12, a criterion point may be determined to perform a quality determination image acquisition area search.

A criterion point 1210 may be the center point of an image area with the widest viewing angle in at least one quality determination image 1200 included in a quality determination image acquisition area. For example, when the collected quality determination image 1200 includes a first side image 1230 and a second side image 1240 of a product, the center point of an image having a wider viewing angle among the first side image 1230 and the second side image 1240 may be set as the criterion point 1210.

Alternatively, the criterion point 1210 may be determined by additionally considering the picture quality of the collected quality determination image 1200. For example, the criterion point 1210 may be determined by additionally considering whether the collected quality determination image 1200 has picture quality of a threshold or more.

Otherwise, the criterion point 1210 may be determined per collected quality determination image 1200. When there are a plurality of reference images, the center point of each of a plurality of quality determination images 1200 may be set as a criterion point 1210. In this case, there may be a plurality of criterion points 1210.

After the criterion point 1210 is determined, the criterion point 1210 of the quality determination image 1200 is matched with the criterion point 1210 of a second product photograph image, and a threshold angle is determined on the basis of the criterion point 1210 so that a difference between the quality determination image 1200 and the second product photograph image 1250 may be analyzed. The threshold angle may be determined on the basis of the viewing angle of the quality determination image 1200.

An image difference area in which the difference between the quality determination image 1200 and the second product photograph image 1250 is present may be extracted.

It may be determined whether the image difference area includes an element for determining the quality of the product by determining the quality of the extracted image difference area. Product quality determination based on the image difference area may be performed on the basis of a product quality determination algorithm like a quality determination image non-acquisition area search.

The product quality determination algorithm will be described in further detail below according to an exemplary embodiment of the present invention.

Figure 13:
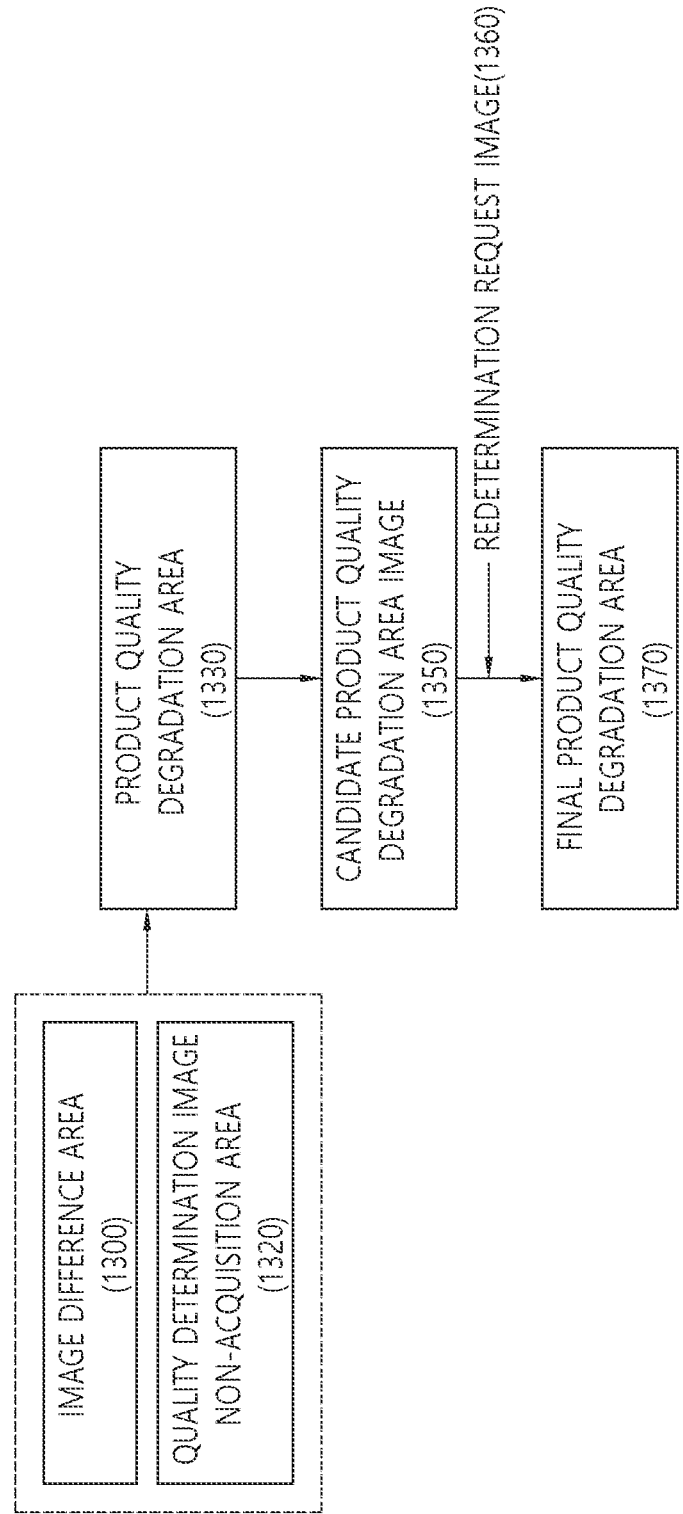
FIG. 13 is a conceptual diagram illustrating a product quality determination method according to an exemplary embodiment of the present invention.

FIG. 13 is a conceptual diagram illustrating a product quality determination method according to an exemplary embodiment of the present invention.

FIG. 13 shows a product quality determination algorithm for products. A product quality determination process may be performed to determine product quality in an image difference area that is extracted after a quality determination image acquisition area search and a quality determination image non-acquisition area.

Referring to FIG. 13, a product quality determination device may learn grade determination images for determining product quality. In the present invention, labeling for the grade determination images for determining product-specific quality may be performed for learning of product quality. For example, grade determination images that are available for a bag may be labeled with the product name "bag" to perform learning. Through this learning, factors by which product-specific quality is determined are learned, and a procedure for determining product quality may be performed in an image difference area 1300 and a quality determination image non-acquisition area 1320. Such product quality learning may be continuously performed on the basis of grade determination images which are accumulated when product quality is determined.

Through the product quality determination process, a specific area in the image difference area 1300 and the quality determination image non-acquisition area 1320 may be determined as a product quality degradation area 1330, and a candidate product quality degradation area image 1350 which is an image of the product quality degradation area 1330 may be extracted.

The product quality determination device may determine the quality of the product on the basis of product quality determination result information including the candidate product quality degradation area image 1350. The product quality determination result information including the candidate product quality degradation area image 1350 may be transmitted to a seller of the product. The seller may check a portion that is not determined to be a problematic area in product quality and request a redetermination from the product quality determination device. To request a redetermination, a redetermination request image 1360 corresponding to the product quality determination result information may be captured and transmitted to the product quality determination device. The redetermination request image 1360 is an image corresponding to the candidate product quality degradation area image 1350 and may be an image for redetermining product quality.

To request the redetermination request image 1360, the product quality determination device may specify and provide a portion of the product corresponding to the candidate product quality degradation area image 1350.

The product quality determination device may perform a product quality determination process again on the basis of the redetermination request image 1360 to redetermine the quality of the product. When it is determined as a redetermination result that the portion is not a factor that degrades product quality, the candidate product quality degradation area image 1350 corresponding to the redetermination request image 1360 may be excluded from a final product quality degradation area image 1370.

The candidate product quality degradation area image 1350 of which a redetermination is not requested by the seller and an image of the product quality degradation area which is determined as a factor that degrades product quality as a redetermination result may be determined as the final product quality degradation area image 1370. The final product quality degradation area image 1370 may be used as basic data for the product quality determination device to determine product quality.

Figure 14:
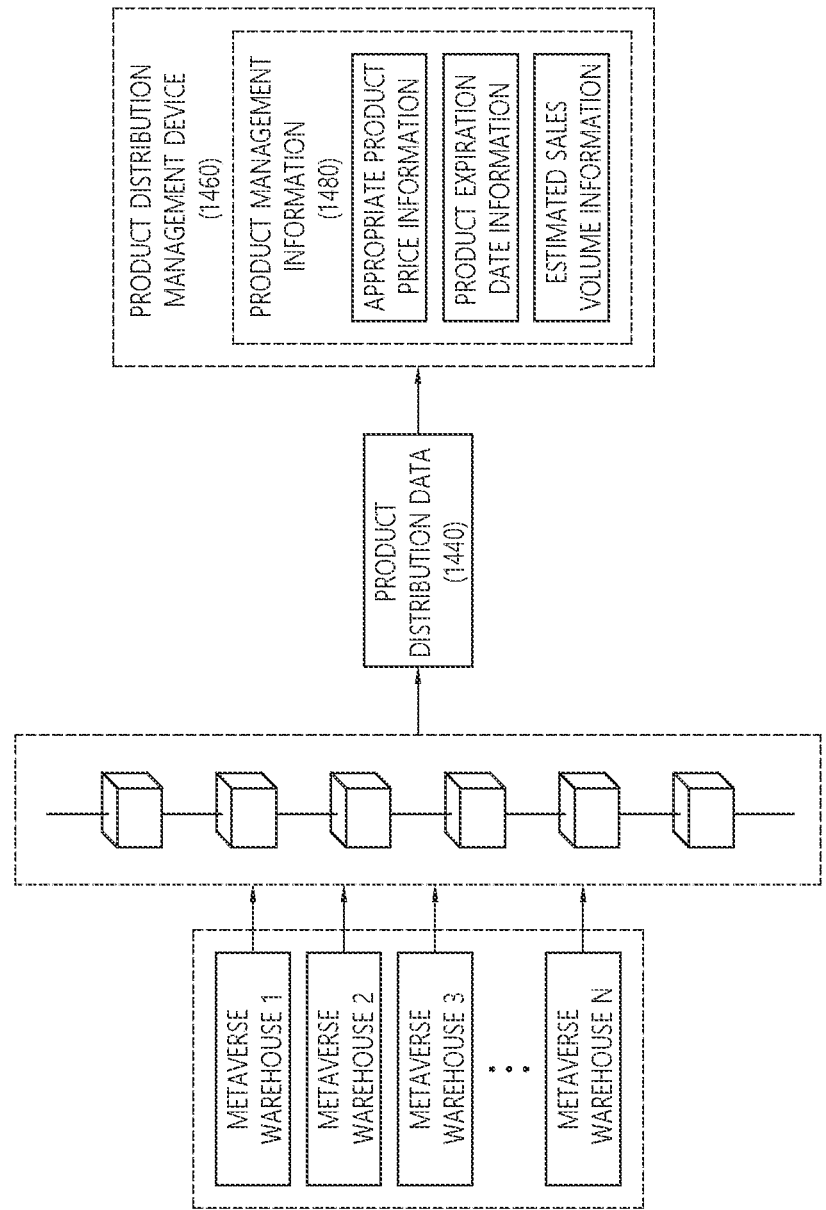
FIG. 14 is a conceptual diagram illustrating a method of managing product distribution at metaverse warehouses according to an exemplary embodiment of the present invention.

FIG. 14 is a conceptual diagram illustrating a method of managing product distribution at metaverse warehouses according to an exemplary embodiment of the present invention.

FIG. 14 shows a method of helping a product seller sell products on the basis of distribution information at a plurality of metaverse warehouses.

Referring to FIG. 14, a product warehousing procedure, storage procedure, and unstoring procedure based on NFTs and FTs may be performed in each of a plurality of metaverse warehouses 1400, and hash values in accordance with the product warehousing procedure, storage procedure, and unstoring procedure may be stored on a blockchain 1420.

Product distribution data 1440 in accordance with the product warehousing procedure, storage procedure, and unstoring procedure based on the blockchain 1420 may be collected from each of the plurality of metaverse warehouses 1400, and a product distribution management device 1460 may manage distribution of products on the basis of the product distribution data 1440.

The product distribution management device 1460 may provide product management information 1480 to each seller on the basis of the product distribution data 1440. The product management information 1480 may include appropriate product price information, product expiration date information, etc.

When a seller sells product A, appropriate product price information may be determined by considering the sales price of product A unstored from another metaverse warehouse as information on another seller's sales price of product A.

In other words, the seller may receive appropriate product price information that is determined on the basis of other seller's sales price information of product A which is the same product, and may adjust the price of product A on the basis of the appropriate product price information. The product distribution management device 1460 may also provide estimated sales volume information based on the price of product A set by the seller.

When a product has an expiration date, the product distribution management device 1460 may provide the product expiration date information and appropriate product price information in accordance with the expiration date to the seller.

For example, foods such as meat and vegetables may be products that are degraded in value over time. The product distribution management device 1460 may provide appropriate product price information that reflects value degraded over time.

Figure 15:
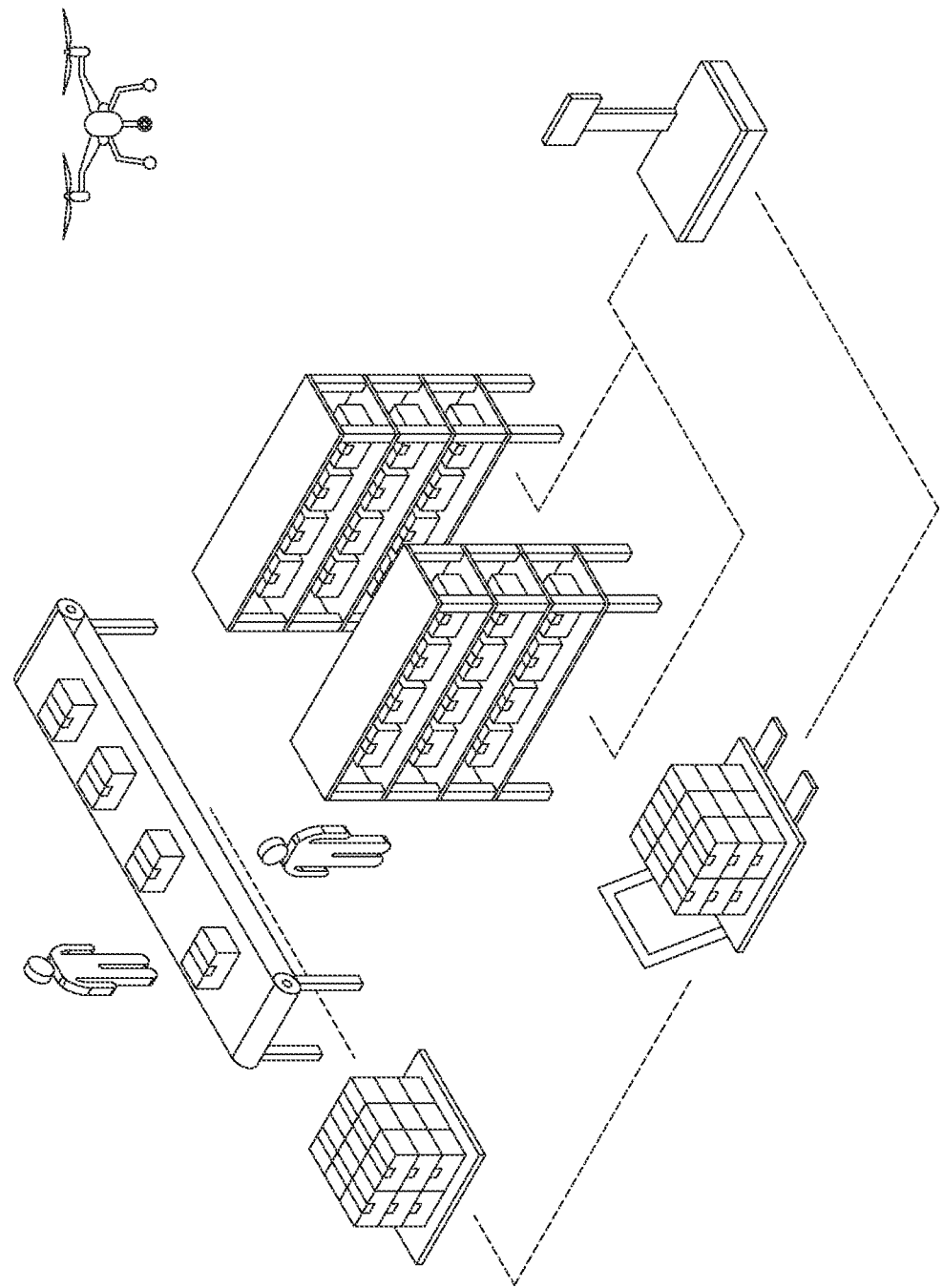
FIG. 15 is a conceptual diagram illustrating a method of providing product image information at a metaverse warehouse.

FIG. 15 is a conceptual diagram illustrating a method of providing product image information at a metaverse warehouse.

FIG. 15 shows a method of providing product image information captured by an image capturing device in a warehouse to provide information on products at a metaverse warehouse.

Referring to FIG. 15, an image capturing device may be present in a metaverse warehouse, and a seller may check a product storage state by clicking on the metaverse warehouse. For example, image capturing devices for separately photographing areas may be present in storage areas of a metaverse warehouse, and the image capturing devices may check product storage states on the basis of storage location information of products, capture product storage states as images, and provide the images.

Alternatively, there may be a drone or a photography robot. When there is a seller's request for the metaverse warehouse, the drone or the photography robot may move to a location at which the seller's product is stored so that a product-captured image may be provided.

The metaverse warehouse may be formed in the same way as an actual warehouse on the basis of a digital twin technology, and the seller can check actual images of products on the basis of the metaverse warehouse.

Figure 16:
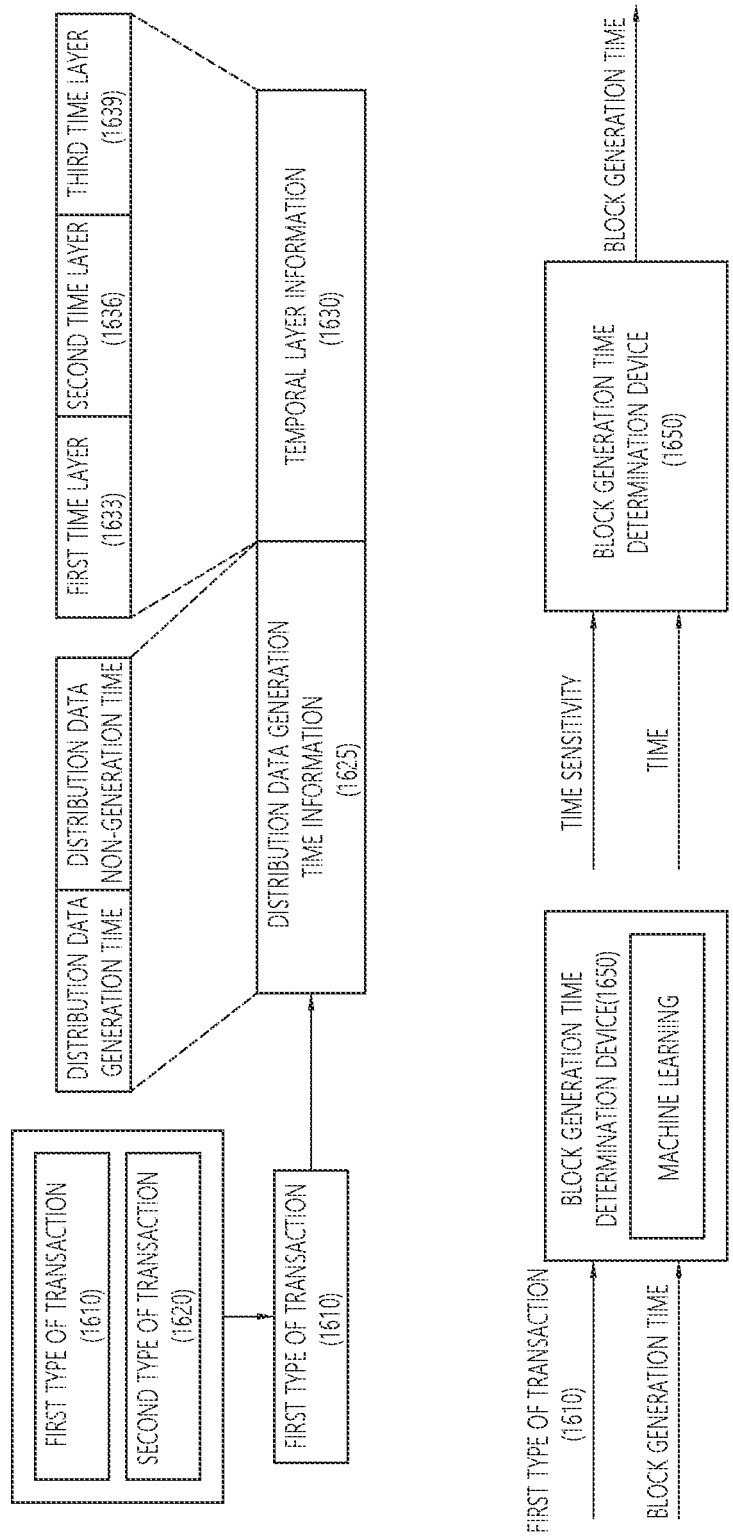
FIG. 16 is a conceptual diagram illustrating a method of processing product warehousing, unstoring, and storage data on a blockchain according to an exemplary embodiment of the present invention.

FIG. 16 is a conceptual diagram illustrating a method of processing product warehousing, unstoring, and storage data on a blockchain according to an exemplary embodiment of the present invention.

FIG. 16 shows a method of processing product distribution data on a blockchain.

Referring to FIG. 16, a block generation time on a blockchain may be adjusted by considering a processing time for distribution data.

A blockchain for processing product distribution data according to the present invention may adaptively adjust a block generation time by considering a time in which product distribution data is generated and a time in which product distribution data is not generated. In addition, a block generation time may be relatively adjusted by considering a characteristic of a product (e.g., fresh food) of which distribution data is to be immediately generated by additionally considering a transaction volume included in product distribution data generated by each of a plurality of warehouses (or a plurality of metaverse warehouses).

A blockchain data processing device (or a blockchain data processor) may determine an estimated block generation time on the basis of a block generation time that adaptively varies as described above.

To generate a block on the blockchain, the blockchain data processing device may include a plurality of block generation consensus nodes. In the present invention, records of transactions made on the blockchain may be collected by time periods, and block generation times may be adaptively determined on the basis of the transaction records by time periods.

Transactions may be classified into two types. In the first type of transactions, a block generation time is important. The first type of transactions may include transactions related to product warehousing and product unstoring. In the second type of transactions, a block generation time is not important. The second type of transactions may include transactions related to product storage or transactions for determining an appropriate product price.

A block generation time determination device 1650 may determine a block generation time on the basis of made transactions. The block generation time determination device 1650 may filter a second type of transaction 1620 and extract a first type of transaction 1610 to perform learning for determining a block generation time.

First, distribution data generation times (or product warehousing, storage, and unstoring times) and distribution data non-generation times (or times at which product warehousing, storage, and unstoring are not performed) may be distinguished, and transaction times may be divided into a hierarchy so that transaction volumes occurring by hours may be learned.

The block generation time determination device 1650 may perform learning for determining a block generation time on the basis of the first type of transaction 1610 and a block generation time corresponding to the first type of transaction 1610.

For learning for determining a block generation time, the first type of transaction 1610 may include distribution data generation time information 1625 about whether it is a distribution data generation time or a distribution data non-generation time and temporal layer information 1630. The temporal layer information 1630 is information obtained by stratifying time units and may be used to generate blocks in consideration of the time sensitivity of block generation times by stratifying time units.

A first temporal layer 1633 may be the smallest time units, that is, units of seconds, a second temporal layer 1636 may be units of minutes, and a third temporal layer 1639 may be units of hours. Due to such a setting of temporal layers, block generation times based on second-unit sensitivity, block generation times based on minute-unit sensitivity, and block generation times based on hour-unit sensitivity may be learned.

The block generation time determination device 1650 may set a time sensitivity (the second-unit sensitivity, the minute-unit sensitivity, or the hour-unit sensitivity) and generate a block on the basis of results of learning so that a block generation time becomes a threshold block generation time or less. For example, the block generation time determination device 1650 sets a time sensitivity to the second-unit sensitivity, a block may be generated so that a block generation time becomes the threshold block generation time or less in the second-unit sensitivity.

Figure 17:
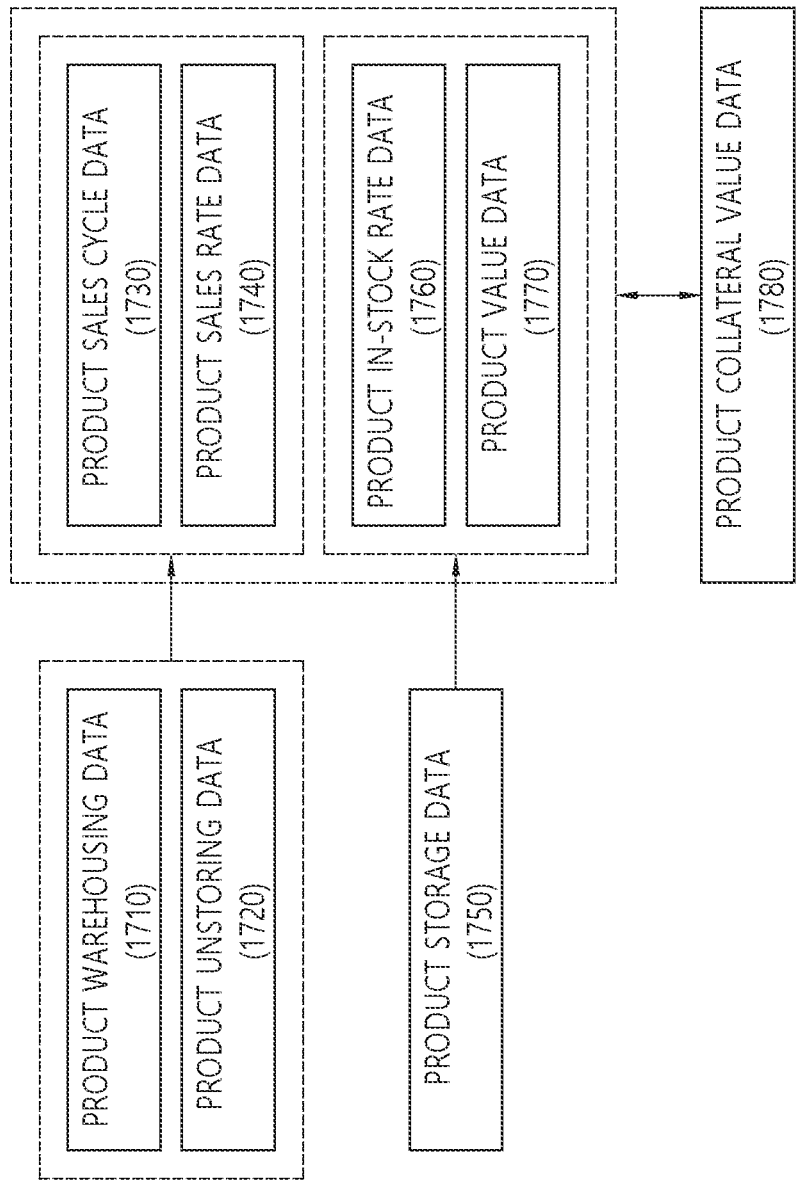
FIG. 17 is a conceptual diagram illustrating a method of determining a product collateral value in a metaverse warehouse according to an exemplary embodiment of the present invention.

FIG. 17 is a conceptual diagram illustrating a method of determining a product collateral value in a metaverse warehouse according to an exemplary embodiment of the present invention.

FIG. 17 shows a method of determining a product collateral value of a product of a seller by processing product distribution data generated in a metaverse warehouse.

Referring to FIG. 17, product distribution data generated on the basis of warehousing, piling-up, stocking, packaging, unstoring, etc. of a seller's products may be managed overall in an integrative manner in a metaverse warehouse.

Each of product warehousing data 1710, product storage data 1750, and product unstoring data 1720 which are product distribution data may be processed to generate product collateral value data 1780.

Specifically, product sales cycle data 1730 and product sales rate data 1740 may be determined on the basis of the product warehousing data 1710 and the product unstoring data 1720. Also, product in-stock rate data 1760 and the product value data 1770 may be determined on the basis of the product storage data 1750.

Each of the product sales cycle data 1730, the product sales rate data 1740, the product in-stock rate data 1760, and the product value data 1770 may be used for determining the product collateral value data 1780 of the seller.

The product sales cycle data 1730 relates to a product sales cycle and may be a cycle from when a product is warehoused in a warehouse to when the product is unstored. A plurality of products sold by the seller may have different sales cycles, and a sales cycle may be determined for each of the plurality of products.

The product sales rate data 1740 is data related to the number of warehoused products and the number of unstored products and may be data about a ratio of a sales volume to the number of warehoused products. The product sales rate data 1740 may also be determined with respect to each of a plurality of products.

The product value data 1770 is data about characteristics of the product of the seller and may include data about sales characteristics of the product such as a product price range, a product sales target, product liquidity, a product inventory characteristic, etc. The product value data 1770 may be generated on the basis of data, such as the product sales target, the product liquidity, and the product inventory characteristic, generated through a product characteristic database associated with an external server.

Data about product-specific target consumer groups, data about whether the product is liquidatable and the liquation rate of the product, data about the cost of storing product inventory and a period for which the product inventory is storable, and general data related to the product, such as product sales by time (day, month, and year), a product return rate, etc., may be stored in a database, and the product value data 1770 may be generated in association with the database.

Figure 18:
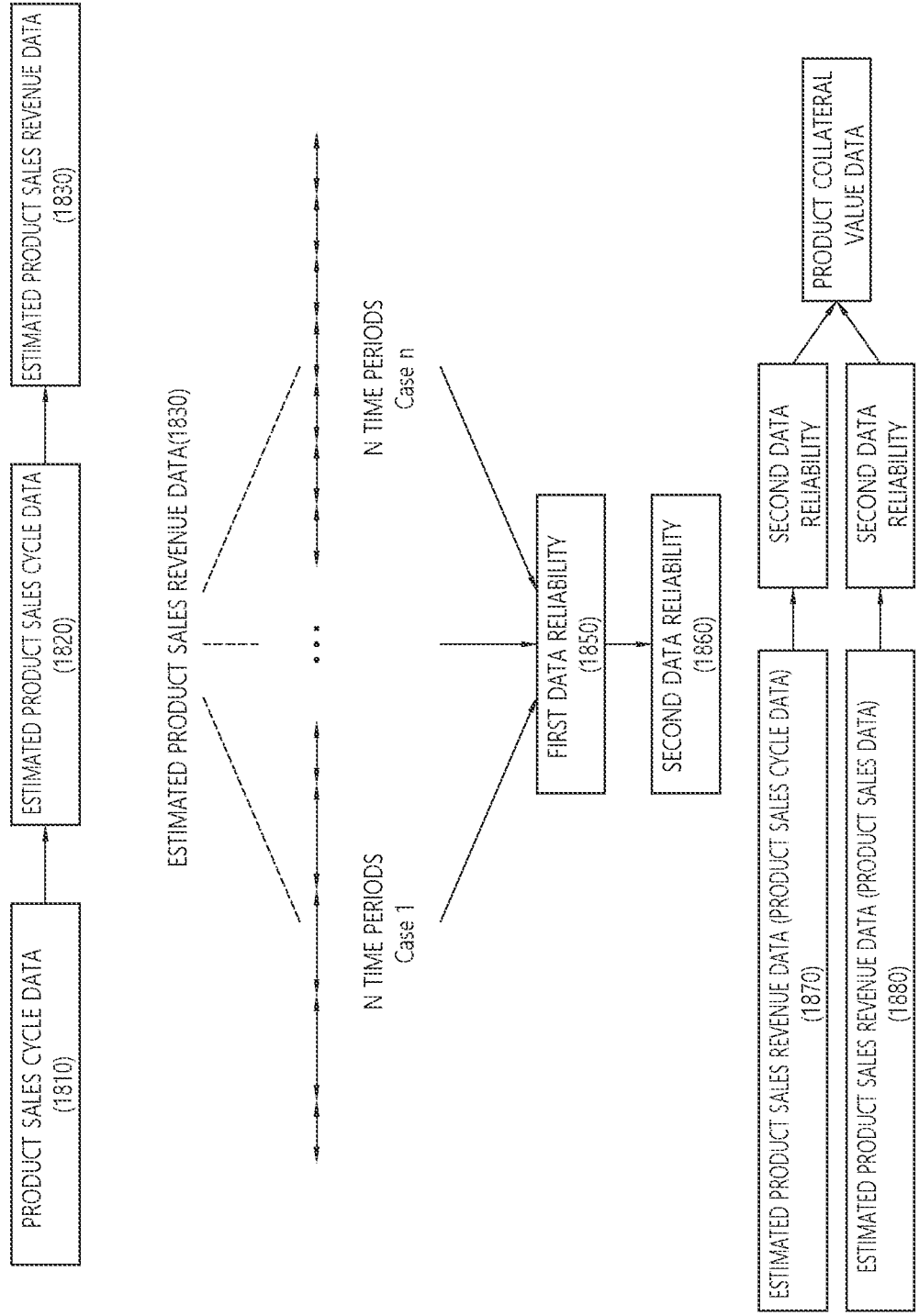
FIG. 18 is a conceptual diagram illustrating a method of determining product collateral value data according to an exemplary embodiment of the present invention.

FIG. 18 is a conceptual diagram illustrating a method of determining product collateral value data according to an exemplary embodiment of the present invention.

FIG. 18 shows a method of determining product collateral value data in consideration of product sales cycle data and product sales rate data.

Unlike existing collateral valuation, product collateral value data may be determined by additionally considering products currently present in a metaverse warehouse and the sales cycle and the value of products present in the metaverse warehouse, and an amount that may be loaned to a seller and an interest rate may be determined on the basis of the product collateral value data.

More specifically, information on products that are sold after the time of loan until the maturity date of the loan may be estimated on the basis of product sales cycle data 1810, and product collateral value data may be determined on the basis of the estimated data. An amount that may be loaned to the seller until the maturity date of the loan and an interest rate may be determined on the basis of the product collateral value data.

Also, according to an exemplary embodiment of the present invention, the product sales cycle data 1810 may be processed to determine product collateral value data.

The product sales cycle data 1810 may be converted into estimated product sales cycle data 1820. The estimated product sales cycle data 1820 may be converted into period-specific estimated product sales revenue data 1830 by considering information on the sales price and cost of the product, sales margin, etc.

The estimated product sales revenue data 1830 may be converted into period-specific data by considering a determined sales period, such as a day, a week, or a month, a financial service period of the seller, etc. First data reliability of the estimated product sales revenue data 1830 may be determined on the basis of the period-specific data of the estimated product sales revenue data 1830. The first data reliability 1850 is reliability in the repeatability of a pattern and may have a high value when it is highly likely that similar estimated product sales revenue data will be obtained later.

For example, estimated product sales revenue data may be divided into n time periods having different lengths for increasing an estimation probability in consideration of time, and a combination of n time periods having the highest first data reliability 1850 may be defined as one estimation cycle. Subsequently, the estimated product sales revenue data 1830 of the next n time periods may be estimated by considering the n different time periods corresponding to the estimation cycle.

n time periods of a seller who has a constant amount of sales with no seasonality may be divided almost uniformly. In the case of a seller whose product has high seasonality or who has a relatively large change in product sales, n time periods may have different lengths in consideration of seasonality and the change in product sales.

In this way, one estimation cycle of the estimated product sales revenue data 1830 for future estimation is divided into n time periods, and learning and estimation are performed by considering the n time periods. Accordingly, product collateral value data can be accurately determined.

Also, in the present invention, second data reliability 1860 of the estimated product sales revenue data 1830 may be determined in comparison with an actual profit. The weight of the estimated product sales revenue data 1830 for determining product collateral value data may be determined in accordance with the second data reliability 1860.

The estimated product sales revenue data 1830 based on the product sales cycle data 1810 is determined by considering the above-described estimation cycle. In other words, when a period in which the estimation cycle is taken into consideration passes after the product sales revenue data 1830 is generated, product sales revenue data is to be generated in a range similar to the estimated product sales revenue data 1830.

When an error between the estimated product sales revenue data 1830 and the product sales revenue data is relatively large, the second data reliability 1860 may be determined to be relatively low. On the other hand, when an error between the estimated product sales revenue data 1830 and the product sales revenue data is relatively small, the second data reliability 1860 may be determined to be relatively high. The second data reliability 1860 is taken into consideration to determine the weight of the estimated product sales revenue data 1830 for determining product collateral value data.

To classify the source of data, estimated product sales revenue data based on the product sales cycle data 1810 may be defined by the term "estimated product sales revenue data (product sales cycle data) 1870," and estimated product sales revenue data based on the product sales data may be defined by the term "estimated product sales revenue data (product sales data) 1880,"

The weight of each of the estimated product sales revenue data (product sales cycle data) 1870 and the estimated product sales revenue data (product sales data) 1880 for determining product collateral value data may be determined considering the above-described second data reliability 1860.

Figure 19:
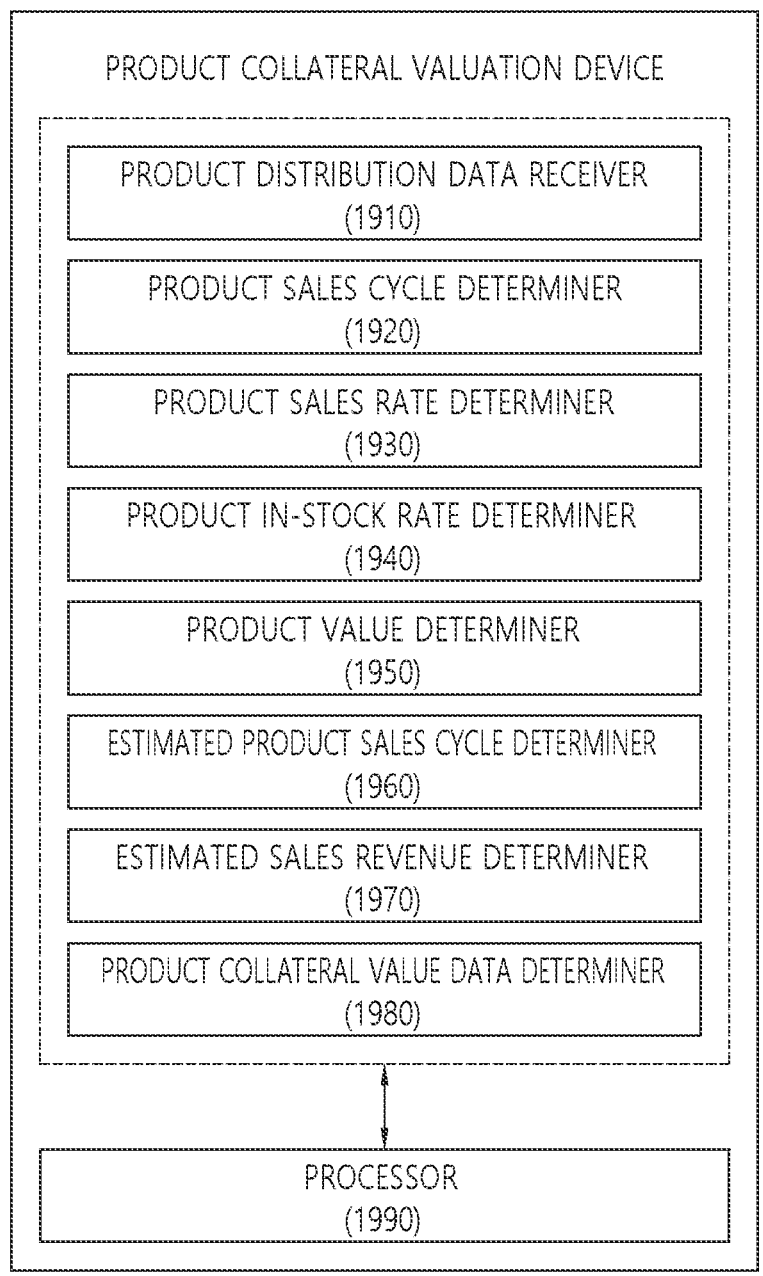
FIG. 19 is a conceptual diagram illustrating a product collateral valuation device according to an exemplary embodiment of the present invention.

FIG. 19 is a conceptual diagram illustrating a product collateral valuation device according to an exemplary embodiment of the present invention.

FIG. 19 shows a product collateral valuation device for determining product collateral value data.

Referring to FIG. 19, the product collateral valuation device may include a product distribution data receiver 1910, a product sales cycle determiner 1920, a product sales rate determiner 1930, a product in-stock rate determiner 1940, a product value determiner 1950, an estimated product sales cycle determiner 1960, an estimated sales revenue determiner 1970, a product collateral value data determiner 1980, and a processor 1990.

The product distribution data receiver 1910 may be intended to receive product warehousing data, product storage data, and product unstoring data.

The product sales cycle determiner 1920 may be intended to determine a sales cycle of the product on the basis of the product warehousing data and the product unstoring data.

The product sales rate determiner 1930 may be intended to determine a sales rate of the product on the basis of the product warehousing data and the product unstoring data.

The product in-stock rate determiner 1940 may be intended to determine an in-stock rate of the product on the basis of the product storage data.

The product value determiner 1950 may be intended to determine a value of the product on the basis of data about sales characteristics of the product such as a product price range, a product sales target, product liquidity, a product inventory characteristic, etc.

The estimated product sales cycle determiner 1960 may be intended to determine estimated product sales cycle data on the basis of product sales cycle data.

The estimated sales revenue determiner 1970 may be intended to determine estimated product sales revenue data (product sales cycle data) and estimated product sales revenue data (product sales data). The product collateral valuation device may determine product collateral value data on the basis of the estimated product sales revenue data.

The product collateral value data determiner 1980 may determine product collateral value data on the basis of the product sales cycle data, product sales rate data, product in-stock rate data, and product value data.

The product sales cycle data may be converted into estimated product sales cycle data, and the estimated product sales cycle data may be converted into estimated product sales revenue data. The product collateral value data determiner 1980 may determine product collateral value data on the basis of the estimated product sales revenue data.

The processor 1990 may control operations of the product distribution data receiver 1910, the product sales cycle determiner 1920, the product sales rate determiner 1930, the product in-stock rate determiner 1940, the product value determiner 1950, the estimated product sales cycle determiner 1960, the estimated sales revenue determiner 1970, and the product collateral value data determiner 1980.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

What is claimed is:

1. A computer-implemented method of assigning a product collateral value of one or more products in a metaverse warehouse by a metaverse warehouse implementation system based on artificial intelligence learning, the metaverse warehouse implementation system including a metaverse warehouse implementation device having one or more processors, the method comprising:
receiving, by a product collateral valuation device, product distribution data including product warehousing data, product unstoring data, and product storage data each generated by the one or more processors from the metaverse warehouse, the product warehousing data being generated on the basis of a non-fungible token (NFT) or a fungible token (FT), wherein the metaverse warehouse is obtained by implementing an actual warehouse in a metaverse and the one or more processors are implemented to check product warehousing, storage and unstoring in the metaverse in real time on the basis of hardware including a camera or a sensor implemented in the actual warehouse such that a user accesses the metaverse warehouse to check a state of a product without visiting the actual warehouse;
determining, by the product collateral valuation device, product sales cycle data and product sales rate data of the one or more products on the basis of the product warehousing data and the product unstoring data;
converting, by the product collateral valuation device, the product sales cycle data into estimated product sales cycle data;
converting, by the product collateral valuation device, the estimated product sales cycle data into estimated product sales revenue data by considering information on sales price, sales margin, or cost of the one or more products, wherein one estimation cycle of the estimated product sales revenue data for future estimation is divided into n time periods and artificial intelligence learning and estimation are performed by considering the n time periods;
determining, by the product collateral valuation device, product in-stock rate data of the one or more products on the basis of the product storage data;
determining, by the product collateral valuation device, product value data of the one or more products on the basis of data about sales characteristics including a product price range, a product sales target, product liquidity or a product inventory characteristic; and
determining, by the product collateral valuation device, product collateral value data based on the estimated product sales revenue data, the product sales cycle data, the product sales rate data, the product in-stock rate data or the product value data based on the product storage data, wherein a loan is provided to a seller of the one or more products, the loan being secured by the one or more products, and a loan amount and an interest rate of the loan are determined based on the product collateral value data, and wherein information on products that are sold after the loan until the maturity of the loan is estimated based on the product sales cycle data.

2. The method of claim 1, wherein the one estimation cycle is a combination of the n time periods having highest first data reliability.

3. The method of claim 2, wherein n time periods associated with products having a constant amount of sales with no seasonality are divided uniformly, and wherein n time periods associated with products having high seasonality or a relatively large change in product sales have different lengths.

4. The method of claim 1, wherein the metaverse warehouse implementation system further includes a supply chain data processing device, a blockchain data processor and a blockchain network.

5. The method of claim 4, further comprising:
collecting and processing, by the supply chain data processing device, supply chain data generated in a supply chain to actually distribute products.

6. The method of claim 5, further comprising:
transmitting, by the blockchain data processor, data generated by the supply chain data processing device and the metaverse warehouse implementation device to the blockchain network in real time, or
transmitting, by the blockchain data processor, periodically packaged data to the blockchain network.

7. The method of claim 5, further comprising:
transmitting, by the blockchain data processor, a smart contract for data processing on a blockchain to the blockchain network; and
performing, by the blockchain data processor, data processing on the blockchain based on the smart contract, the smart contract being generated based on an action of the metaverse warehouse implementation device.

8. The method of claim 1, wherein a first-type product includes a product that requires individual product identification, and a second-type product includes a product that does not require individual product identification, the first-type product being generated on the basis of the NFT and managed with the NFT, the second-type product being generated on the basis of the FT and managed with the FT.

9. The method of claim 8, wherein operations corresponding to product warehousing, storage, and unstoring in the metaverse are checked based on movement of the NFT and the FT corresponding to products in the blockchain, and wherein product warehousing data, product storage data and product unstoring data corresponding to the NFT and the FT are stored in a metaverse warehouse management server, and hash values of the product warehousing data, the product storage data, and the product unstoring data corresponding to the NFT and the FT are recorded on the blockchain so that the authenticity of data is checked.

10. The method of claim 8, wherein a single NFT product management of the first-type product includes:
generating an NFT for a product from a product warehousing address and matching the NFT for the product with the product warehousing data, the NFT for the product and the product warehousing data being generated as a first hash value to be recorded on a blockchain,
transmitting the NFT for the product to a product storage address and matching the NFT for the product with the product storage data, the NFT for the product and the product storage data being generated as a second hash value to be recorded on the blockchain, and
transmitting the NFT for the product to a product unstoring address and matching the NFT for the product with the product unstoring data, the NFT for the product and the product unstoring data being generated as a third hash value to be recorded on the blockchain.

11. The method of claim 10, wherein the product warehousing address, the product storage address, and the product unstoring address are wallet addresses that generate transactions on the blockchain and wherein movement of the first-type product in the metaverse warehouse is tracked based on movement of the NFT for the product and the hash values, and users are able to accurately check movement of the product in the metaverse warehouse.

12. The method of claim 10, wherein the single NFT product management is used when it is necessary to continuously manage an NFT in a supply chain after unstoring from the metaverse warehouse.

13. The method of claim 8, wherein an operation-specific NFT product management for the first-type product includes:
   generating NFTs based on product warehousing data, product storage data, and product unstoring data in a product warehousing procedure, a product storage procedure, and a product unstoring procedure, respectively, without generating a hash value.

14. The method of claim 13, wherein the operation-specific NFT product management is used when it is necessary to manage a product in the metaverse warehouse only.

15. The method of claim 1, wherein the one or more products have been registered and verified to be implemented in the metaverse warehouse, wherein supply chain data generated by a supply chain data processing device is matched with the one or more products for product registration and qualitative data in the supply chain data is checked for product verification, a product verification system including a product information input device, a product conveyor belt, a vision sensor device, and a product quality determination device structured to determine quality of the one or more products and learn the quality of the products based on learning of product-specific photograph images and learning of product-specific weight data.

16. A device having a non-transitory memory including instructions for assigning a product collateral value of one or more products in a metaverse warehouse by a metaverse warehouse implementation system based on artificial intelligence learning, the metaverse warehouse implementation system including a metaverse warehouse implementation device having one or more processors, wherein the device is implemented to:
   receive product distribution data including product warehousing data, product unstoring data, and product storage data generated by the one or more processors from the metaverse warehouse, the product warehousing data being each generated on the basis of a non-fungible token (NFT) or a fungible token (FT), wherein the metaverse warehouse is obtained by implementing an actual warehouse in a metaverse and the one or more processors are implemented to check product warehousing, storage and unstoring in the metaverse in real time on the basis of hardware including a camera or a sensor implemented in the actual warehouse such that a user accesses the metaverse warehouse to check a state of a product without visiting the actual warehouse;
   determine product sales cycle data and product sales rate data of the one or more products on the basis of the product warehousing data and the product unstoring data;
   convert the product sales cycle data into estimated product sales cycle data;
   convert the estimated product sales cycle data into estimated product sales revenue data by considering information on sales price, sales margin, or cost of the one or more products, wherein one estimation cycle of the estimated product sales revenue data for future estimation is divided into n time periods and artificial intelligence learning and estimation are performed by considering the n time periods;
   determine product in-stock rate data of the one or more products on the basis of the product storage data;
   determine product value data of the one or more products on the basis of data about sales characteristics including a product price range, a product sales target, product liquidity or a product inventory characteristic; and
   determine product collateral value data based on the estimated product sales revenue data, the product sales cycle data, the product sales rate data, the product in-stock rate data or the product value data based on the product storage data, wherein a loan is provided to a seller of the one or more products, the loan being secured by the one or more products, and a loan amount and an interest rate of the loan are determined based on the product collateral value data, and wherein information on products that are sold after the loan until the maturity of the loan is estimated based on the product sales cycle data.

* * * * *